US011992754B2

(12) United States Patent
Matsuura

(10) Patent No.: US 11,992,754 B2
(45) Date of Patent: May 28, 2024

(54) INFORMATION STORAGE MEDIUM, GAME DEVICE, AND GAME SYSTEM

(71) Applicant: CYGAMES, INC., Tokyo (JP)

(72) Inventor: Hiroki Matsuura, Tokyo (JP)

(73) Assignee: CYGAMES, INC., Tokyo (JP)

( * ) Notice: Subject to any disclaimer, the term of this patent is extended or adjusted under 35 U.S.C. 154(b) by 322 days.

(21) Appl. No.: 17/465,258

(22) Filed: Sep. 2, 2021

(65) Prior Publication Data

US 2021/0394049 A1 Dec. 23, 2021

Related U.S. Application Data

(63) Continuation of application No. PCT/JP2020/008998, filed on Mar. 3, 2020.

(30) Foreign Application Priority Data

Mar. 7, 2019 (JP) ................ 2019-041828

(51) Int. Cl.
*A63F 13/323* (2014.01)
*A63F 13/533* (2014.01)
*A63F 13/55* (2014.01)

(52) U.S. Cl.
CPC .......... *A63F 13/323* (2014.09); *A63F 13/533* (2014.09); *A63F 13/55* (2014.09)

(58) Field of Classification Search
CPC ...... A63F 13/323; A63F 13/533; A63F 13/55; A63F 13/30; A63F 13/53; A63F 13/847; A63F 13/87
See application file for complete search history.

(56) References Cited

U.S. PATENT DOCUMENTS 8,992,321 B2 * 3/2015 Fujisawa ................. A63F 13/25
463/32
2006/0287027 A1 * 12/2006 Hardisty ................. A63F 13/10
463/8
2009/0181736 A1 * 7/2009 Haigh-Hutchinson .....................
A63F 13/10
463/2

(Continued)

FOREIGN PATENT DOCUMENTS

JP 2017-47088 A 3/2017
JP 6137773 B2 5/2017

OTHER PUBLICATIONS

Shack Staff. "Horizon Zero Dawn—How to Exploit Machine Weaknesses". Published Feb. 21, 2017 .<https://www.shacknews.com/article/99122/horizon-zero-dawn-how-to-exploit-machine-weaknesses> Accessed Sep. 15, 2023 (Year: 2017).*

(Continued)

*Primary Examiner* — Seng H Lim
(74) *Attorney, Agent, or Firm* — Osha Bergman Watanabe & Burton LLP

(57) ABSTRACT

When one of a first-part HP indication to a third-part HP indication is tapped at one of the terminals participating in a quest, a character icon, a part information indication, and a designation indication are displayed at each of the terminals participating in the quest on the basis of part information, player character information, and player number information of the terminal at which the part HP indication has been tapped. This makes it possible for a player to notify the players at the other terminals of a part that the player wishes to attack.

10 Claims, 15 Drawing Sheets

(56) References Cited

U.S. PATENT DOCUMENTS

2016/0271499 A1* 9/2016 Higo ................. A63F 13/798
2019/0111344 A1* 4/2019 Hiroki ............... A63F 13/833
2020/0306628 A1* 10/2020 Hisaoka ............. A63F 13/822

OTHER PUBLICATIONS

English translation provided by IP.com for JP 2017-47088 A (Year: 2017).*
International Search Report for corresponding International Application No. PCT/JP2020/008998, dated Apr. 21, 2020 (7 pages).
Written Opinionfor corresponding International Application No. PCT/JP2020/008998, dated Apr. 21, 2020 (4 pages).
Dragon's Dogma, Retrieved from Internet on May 29, 2019; Retrieved from Internet: URL: http://game.watch.impress.co.jp/docs/news/446141.html/ (3 pages).
"Shining Force CrossRaid Ver. A Rev. 3"; Monthly magazine Arcadia Dec. 2011. No. 139, vol. 12, No. 12, pp. 110; Oct. 29, 2011 (5 pages).
Dragalia Lost, Retrieved from Internet on Aug. 15, 2021; Retrieved from Internet: URL: http://dragalialost.com/jpl/ (6 pages).
News/Dragalia Lost/Nintendo, Retrieved from Internet on Aug. 15, 2021; Retrieved from Internet: URL: http://dragalialost.com/jp/news/event/690 (4 pages).
Dragalia Lost/ App Store, Retrieved from Internet on Aug. 15, 2021; Retrieved from Internet: URL: http://apps.apple.com/jp/app/id1352230941 (8 pages).
Dragalia Lost/Google Play, Retrieved from Internet on Aug. 15, 2021; Retrieved from Internet: URL: http://play.google.com/store/apps/detailes?is=com.nintendo.zaga&hl=en-US (6 pages).

* cited by examiner

INFORMATION STORAGE MEDIUM, GAME DEVICE, AND GAME SYSTEM

This application is a continuation of International Patent Application No. PCT/JP2020/008998, having an international filing date of Mar. 3, 2020, which designated the United States, the entirety of which is incorporated herein by reference. Japanese Patent Application No. 2019-041828 filed on Mar. 7, 2019 is also incorporated herein by reference in its entirety.

BACKGROUND

The present invention relates to information storage mediums, game devices, and game systems.

There is a type of program that has been known since before and that executes a game in which a common object space is set for a plurality of terminals, an enemy character and player characters corresponding to players at the individual terminals are disposed in the common object space, and the player characters cooperatively battle against the enemy character on the basis of inputs by the players at the individual terminals.

Furthermore, among programs of this type, there is a type of program with which, when the player characters attack the enemy character, a parameter of a part targeted in the attack among a plurality of parts set in the enemy character is updated, and a part for which the parameter has reached a predetermined value becomes broken (see Publication of Japanese Patent No. 6137773).

Among programs of this type, there is a type of program with which text chats or voice chats are enabled for the purpose of communicating intents among the players at the individual terminals; however, there are players who feel that text chats or voice chats are bothersome.

SUMMARY

The present invention has been made in view of the situation described above, and it is an object thereof to provide a non-transitory computer-readable information storage medium storing a program that enables players at individual terminals to readily communicate their intents.

According to a first aspect of the invention, there is provided a non-transitory computer-readable information storage medium storing a program for causing a first character to perform an action on the basis of an input by a player and updating a parameter corresponding to a part satisfying a given condition as a result of the action of the first character among a plurality of parts of a second character, the program causing a computer to function as: a display control unit that displays a plurality of specific indications corresponding to the plurality of parts; and a communication control unit that sends specific information corresponding to a specific player input and player information corresponding to the player to an external network on the basis of the specific player input, the specific player input being an input by the player corresponding to one of the plurality of specific indications, wherein the communication control unit receives the specific information and the player information of another terminal from the external network, and wherein in the case where the specific information and the player information are received, the display control unit, on the basis of the specific information and the player information, displays a part indication indicating a part corresponding to the specific information among the plurality of parts in association with a player indication corresponding to the player information.

According to a second aspect of the present invention, there is provided a game device that causes a first character to perform an action on the basis of an input by a player and updates a parameter corresponding to a part satisfying a given condition as a result of the action of the first character among a plurality of parts of a second character, the game device including: a display control unit that displays a plurality of specific indications corresponding to the plurality of parts; and a communication control unit that sends specific information corresponding to a specific player input and player information corresponding to the player to an external network on the basis of the specific player input, the specific player input being an input by the player corresponding to one of the plurality of specific indications, wherein the communication control unit receives the specific information and the player information of another terminal from the external network, and wherein in the case where the specific information and the player information are received, the display control unit, on the basis of the specific information and the player information, displays a part indication indicating a part corresponding to the specific information among the plurality of parts in association with a player indication corresponding to the player information.

According to a third aspect of the invention, there is provided a game system that, at each of a plurality of terminals, causes a first character corresponding to the terminal to perform an action on the basis of an input by a player at the terminal and updates a parameter corresponding to a part satisfying a given condition as a result of the action of the first character among a plurality of parts of a second character, the second character being common among the individual terminals, wherein each of the terminals includes: a display control unit that displays a plurality of specific indications corresponding to the plurality of parts; and a communication control unit that sends specific information corresponding to a specific player input and player information corresponding to the player to an external network on the basis of the specific player input, the specific player input being an input by the player corresponding to one of the plurality of specific indications, wherein the communication control unit receives the specific information and the player information of another terminal from the external network, and wherein in the case where the specific information and the player information are received, the display control unit, on the basis of the specific information and the player information, displays a part indication indicating a part corresponding to the specific information among the plurality of parts in association with a player indication corresponding to the player information.

Figure 1:
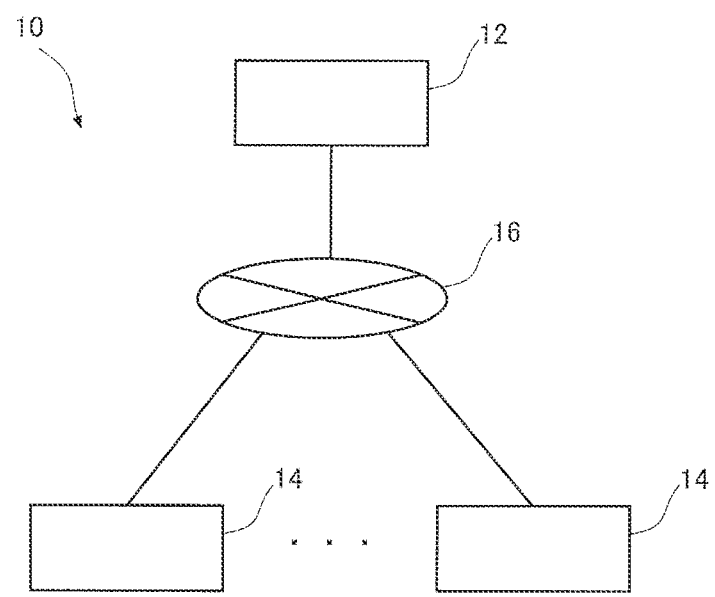
FIG. 1 is a schematic block diagram showing the configuration of an information processing system according to an embodiment of the present invention.

DESCRIPTION OF EXEMPLARY EMBODIMENTS (1) According to one embodiment of the invention, there is provided a non-transitory computer-readable information storage medium storing a program for causing a first character to perform an action on the basis of an input by a player and updating a parameter corresponding to a part satisfying a given condition as a result of the action of the first character among a plurality of parts of a second character, the program causing a computer to function as: a display control unit that displays a plurality of specific indications corresponding to the plurality of parts; and a communication control unit that sends specific information corresponding to a specific player input and player information corresponding to the player to an external network on the basis of the specific player input, the specific player input being an input by the player corresponding to one of the plurality of specific indications, wherein the communication control unit receives the specific information and the player information of another terminal from the external network, and wherein in the case where the specific information and the player information are received, the display control unit, on the basis of the specific information and the player information, displays a part indication indicating a part corresponding to the specific information among the plurality of parts in association with a player indication corresponding to the player information.

According to the present embodiment, when the player performs a specific player input corresponding to one of the plurality of specific indications, at other terminals, a part indication corresponding to the specific indication for which the specific player input has been performed is displayed in association with a player indication corresponding to the player who has performed the specific player input. This makes it possible for players at the individual terminals to readily communicate intents.

(2) Furthermore, in the present embodiment, the display control unit may be configured such that even in the case where the specific information and the player information are further received under a predetermined condition, the display control unit does not display the part indication based on the further received specific information and player information.

With this configuration, it is possible to adjust the frequency of updating of the part indication corresponding to the specific player input.

(3) Furthermore, in the present embodiment, the display control unit may be configured such that, in the case where a predetermined number of part indications are displayed, even in the case where the specific information and the player information are further received, the display control unit does not display the part indication based on the further received specific information and player information.

With this configuration, it is possible to adjust the frequency of updating of the part indication corresponding to the specific player input by restricting updating of the part indication in the case where a predetermined number of part indications are displayed.

(4) Furthermore, in the present embodiment, the display control unit may be configured such that, even in the case where the specific information and the player information are further received, the display control unit does not display the part indication based on the further received specific information and player information until the elapse of a predetermined time since the receipt of the specific information and the player information.

With this configuration, it is possible to adjust the frequency of updating of the part indication corresponding to the specific player input by restricting updating of the part indication until the elapse of the predetermined time since the receipt of the specific information and the player information.

(5) Furthermore, in the present embodiment, the display control unit may be configured such that even in the case where the specific information and the player information are further received, the display control unit does not display the part indication based on the further received specific information and player information until the elapse of a predetermined time since the part indication is displayed.

With this configuration, it is possible to adjust the frequency of updating of the part indication corresponding to the specific player input by restricting updating of the part indication until the elapse of the predetermined time since the part indication is displayed.

(6) Furthermore, in the present embodiment, the display control unit may be configured to display, on the basis of the specific player input, a part indication indicating a part corresponding to the specific player input among the plurality of parts in association with a player indication corresponding to the player information of a local terminal.

With this configuration, when the player performs a specific player input corresponding to one of the plurality of specific indications, a part indication corresponding to the specific indication for which the specific player input has been performed is displayed at the local terminal in association with a player indication corresponding to the player. This makes it possible for the player to confirm his or her own specific player input.

(7) Furthermore, in the present embodiment, the display control unit may be configured such that, even in the case where the specific information and the player information are further received, the display control unit does not display the part indication based on the further received specific information and player information until the elapse of a predetermined time since the specific player input is accepted.

This makes it possible to adjust the frequency of updating of the part indication corresponding to the specific player input by restricting updating of the part indication until the elapse of the predetermined time since the specific player input is accepted.

(8) Furthermore, in the present embodiment, the display control unit may be configured such that, in the case where a predetermined number of part indications are displayed and the specific information and the player information are further received, the display control unit erases the part indication displayed earliest among the predetermined number of part indications under a predetermined condition and displays the part indication based on the further received specific information and player information.

With this configuration, it is possible to limit the number of part indications that can be displayed.

(9) Furthermore, according to another embodiment of the invention, there is provided a game device that causes a first character to perform an action on the basis of an input by a player and updates a parameter corresponding to a part satisfying a given condition as a result of the action of the first character among a plurality of parts of a second character, the game device including: a display control unit that displays a plurality of specific indications corresponding to the plurality of parts; and a communication control unit that sends specific information corresponding to a specific player input and player information corresponding to the player to an external network on the basis of the specific player input, the specific player input being an input by the player corresponding to one of the plurality of specific indications, wherein the communication control unit receives the specific information and the player information of another terminal from the external network, and wherein in the case where the specific information and the player information are received, the display control unit, on the basis of the specific information and the player information, displays a part indication indicating a part corresponding to the specific information among the plurality of parts in association with a player indication corresponding to the player information.

(10) Furthermore, according to another embodiment of the invention, there is provided a game system that, at each of a plurality of terminals, causes a first character corresponding to the terminal to perform an action on the basis of an input by a player at the terminal and updates a parameter corresponding to a part satisfying a given condition as a result of the action of the first character among a plurality of parts of a second character, the second character being common among the individual terminals, wherein each of the terminals includes: a display control unit that displays a plurality of specific indications corresponding to the plurality of parts; and a communication control unit that sends specific information corresponding to a specific player input and player information corresponding to the player to an external network on the basis of the specific player input, the specific player input being an input by the player corresponding to one of the plurality of specific indications, wherein the communication control unit receives the specific information and the player information of another terminal from the external network, and wherein in the case where the specific information and the player information are received, the display control unit, on the basis of the specific information and the player information, displays a part indication indicating a part corresponding to the specific information among the plurality of parts in association with a player indication corresponding to the player information.

Embodiments of the present invention will be described below. Note that the embodiments described below do not unjustifiably limit the content of the present invention as specified in the claims. Furthermore, all the components described in the context of the embodiments are not necessarily indispensable elements constituting the present invention.

1. Configuration of Information Processing System

FIG. 1 is a schematic block diagram showing the configuration of an information processing system 10 according to this embodiment. As shown in FIG. 1, in the information processing system 10, a server device 12 and a plurality of terminal devices 14 are connected via a network 16, such as the Internet, a mobile phone network, a LAN, or a WAN, whereby what is called a client-server communication system is configured. Furthermore, each of the plurality of terminal devices 14 carries out communication mutually with the server device 12 via the network 16 to send and receive various kinds of information, and carries out communication mutually with the other terminal devices 14 via the network 16 and the server device 12 to send and receive various kinds of information.

The server device 12 includes a processor, such as a CPU, a main storage device, such as a ROM or a RAM, an external storage device, such as a hard disk, an input device, such as a keyboard, a display device, such as a liquid crystal display, a communication device, etc. Furthermore, at the server device 12, the CPU executes various kinds of processing according to programs stored in the main storage device or programs loaded from the external storage device into the main storage device, thereby receiving information from the terminal devices 14 or sending information to the terminal devices 14 by means of the communication device.

The terminal devices 14 may be information processing devices of various kinds, such as smartphones, tablets, personal computers, portable game machines, and installed game machines. Each of these devices also includes a processor, such as a CPU, a main storage device, such as a ROM or a RAM, an external storage device, such as a flash memory or a hard disk, an input device, such as a touchscreen, a keyboard, or a microphone, a display device, such as a liquid crystal display or an organic EL display, a sound output device, such as a speaker, a communication device, etc. Furthermore, also at each of the terminal devices 14, the CPU executes various kinds of processing according to programs stored in the main storage device or programs loaded from the external storage device into the main storage device, thereby receiving information from the server device 12 or sending information to the server device 12 or the other terminal devices 14 by means of the communication device.

Figure 2:
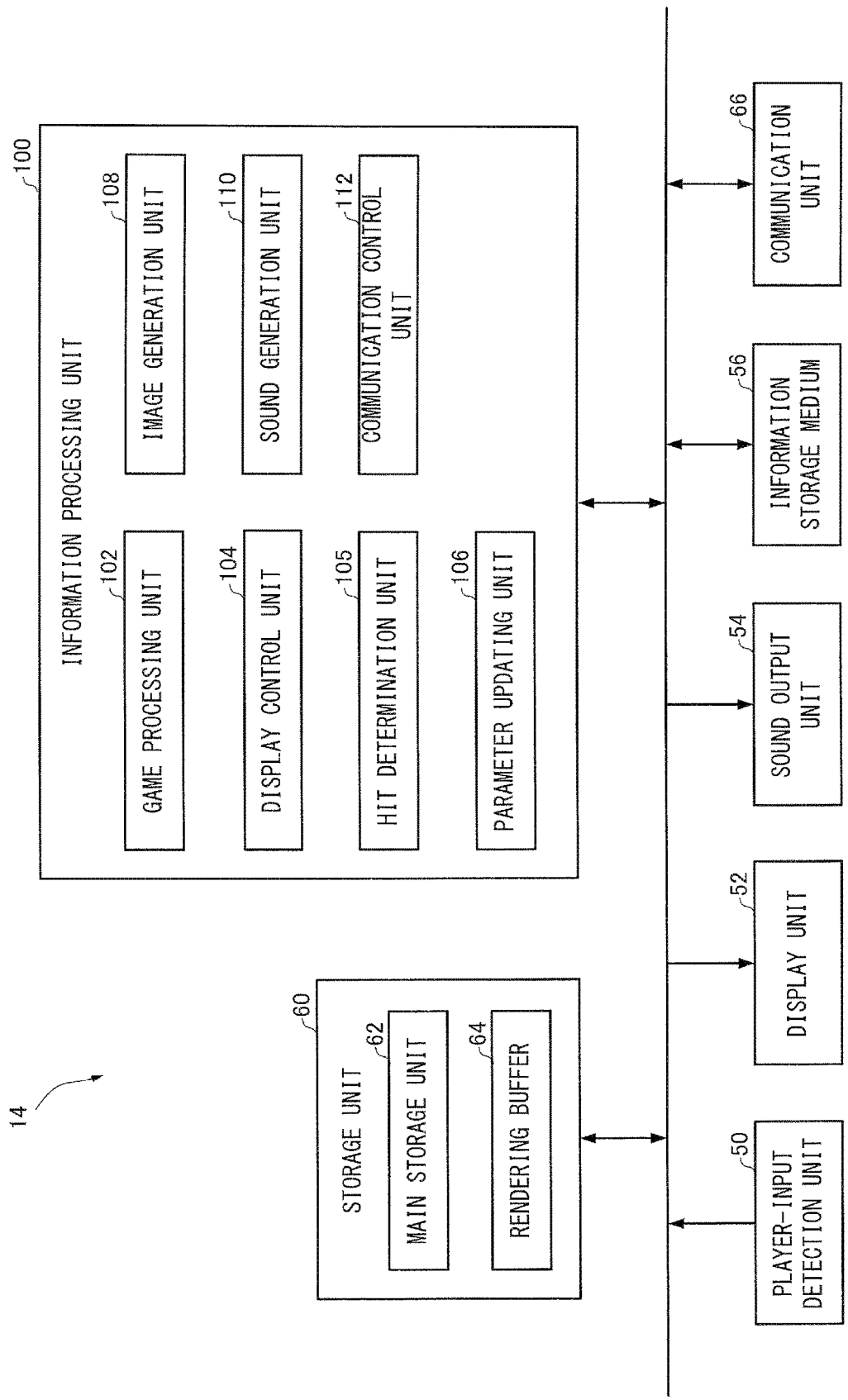
FIG. 2 is a functional block diagram showing the functions of a terminal device in the embodiment of the present invention.

FIG. 2 is a functional block diagram showing the functions of each of the terminal devices 14 in this embodiment. As shown in FIG. 2, each of the terminal devices 14 in this embodiment includes a player-input detection unit 50, a display unit 52, a sound output unit 54, an information storage medium 56, a storage unit 60, a communication unit 66, and an information processing unit 100. Note that some of the constituent elements (individual units) in FIG. 2 may be omitted from the configuration.

The player-input detection unit 50 serves to detect inputs to the terminal device 14 from a player as player inputs, and the function thereof can be realized by means of a touch sensor, a switch, an optical sensor, a microphone, or the like.

The display unit 52 displays an image on a display screen, and the function thereof can be realized by means of a liquid crystal display, an organic EL display, or the like.

The sound output unit 54 outputs sound, and the function thereof can be realized by means of a speaker, a headphone, or the like.

The information storage medium 56 stores programs, data, etc. that allow the information processing unit 100 and the communication unit 66 to execute various kinds of processing, and the function thereof can be realized by means of a flash memory, a hard disk, an optical disk (DVD or BD), etc. That is, the information storage medium 56 stores programs for causing a computer to function as the individual units (programs for causing a computer to execute processing by the individual units) in this embodiment.

The storage unit 60 serves as a work area for the information processing unit 100 or the communication unit 66, and the function thereof can be realized by means of a RAM (main memory) or a VRAM (video memory). Specifically, the storage unit 60 includes a main storage unit 62 into which programs and data are loaded from the information storage medium 56, and a rendering buffer 64 in which an image to be displayed on the display unit 52 is rendered.

The communication unit 66 executes various kinds of control for carrying out communication with an external network (e.g., the server device 12 and the other terminal devices 14), and the function thereof can be realized by means of hardware, such as various kinds of processors or a communication ASIC, programs, or the like.

Note that the programs (data) for causing a computer to function as the individual units in this embodiment may be downloaded from the server device 12 to the information storage medium 56 (or the main storage unit 62) of the terminal device 14 via the network 16 and the communication unit 66, and such usage of the server device 12 may be included in the scope of the present invention.

The information processing unit 100, by using the main storage unit 62 as a work area, executes various kinds of processing, such as game processing, image generation processing, and sound generation processing, on the basis of player inputs detected by the player-input detection unit 50, data received by the communication unit 66, various kinds of programs and data in the storage unit 60, etc., and the function thereof can be realized by means of hardware such as various kinds of processors, (a CPU (main processor), a GPU (rendering processor), a DSP, etc.) or an ASIC, or programs.

Furthermore, the information processing unit 100 includes a game processing unit 102, a display control unit 104, a hit determination unit 105, a parameter update unit 106, an image generation unit 108, a sound generation unit 110, and a communication control unit 112. Note that some of these units may be omitted from the configuration.

The game processing unit 102 executes processing for starting a game in the case where a game start condition is satisfied, processing for executing a game mode selected from among a plurality of kinds of game modes, processing for proceeding with the game, processing for generating an event in the case where an event generation condition is satisfied, processing for computing a game result, processing for terminating the game in the case where a game termination condition is satisfied, etc. on the basis of player inputs detected by the player-input detection unit 50, data received by the communication unit 66, the results of various kinds of processing executed by the information processing unit 100, programs and data loaded in to the main storage unit 62, etc.

The display control unit 104 executes display control for images that are displayed on the display unit 52. Specifically, the display control unit 104 executes display control concerning the displayed content, display mode, display timing, etc. of various kinds of objects or prerendering images (movie images) on the basis of player inputs detected by the player-input detection unit 50, data received by the communication unit 66, the results of various kinds of processing executed by the information processing unit 100, programs and data loaded in to the main storage unit 62, etc.

In this embodiment, the information storage medium 56 stores object data of various kinds of objects including background objects for displaying a background, effect objects for displaying effects, GUI objects for displaying graphical user interfaces (GUIs), such as buttons, character objects for displaying characters, and non-character objects for displaying objects other than characters, such as buildings, tools, vehicles, and terrains, as well as image data of various kinds of prerendering images. Furthermore, the display control unit 104 executes display control for objects and prerendering images on the basis of object data and image data of prerendering images loaded into the main storage unit 62, in accordance with the kind of game mode being executed, the status of progress of the game, etc.

Specifically, the display control unit 104 executes processing for disposing objects in an object space and causing the objects to move or to perform actions on the basis of object data loaded into the main storage unit 62, where the objects are constituted of primitives representing the objects, such as polygons, freeform surfaces, or two-dimensional images. Specifically, on the basis of player inputs detected by the player-input detection unit 50, data received by the communication unit 66, the results of various kinds of processing executed by the information processing unit 100, programs and data loaded into the main storage unit 62, etc., the display control unit 104, on a per-frame (e.g. 1/30 seconds) basis, determines the positions and orientations (rotation angles) of objects in the object space, disposes the objects in the determined orientations at the determined positions, and causes individual parts constituting the objects to perform actions.

Then, in the case where a three-dimensional game image is to be displayed, the display control unit 104 executes processing for controlling the position, rotation angle (viewing direction), and angle of view of a virtual camera (viewpoint) for generating an image as viewed from a given (arbitrary) viewpoint in the object space. In this embodiment, the display control unit 104 controls the position and orientation of the virtual camera so that the virtual camera will follow changes in the position and orientation of a character object that moves and performs actions on the basis of player inputs.

The hit determination unit 105 determines whether or not an attack by the character object has hit another character object (collision determination). Specifically, an attack range is set for an attacking action by the character object, and when the character object performs the attacking action, the attacking direction is determined on the basis of the orientation of the character object at that timing, and the attack range is set in the determined attacking direction. The hit determination unit 105 determines whether or not the set attack range overlaps the range of the character object being attacked and determines that the attack has hit in the case where there is overlapping. In this embodiment, a plurality of kinds of attacking actions are prepared as attacking actions by a character object, including attacks with which the attack range is set in the vicinity of the character object, such as hitting, kicking, and slashing with a sword, as well as attacks with which the attack range moves to a position separated from the character object, such as shooting a gun, fire breathing, and using magic.

In this embodiment in particular, in an enemy character, which acts as an enemy of player characters whose movements and actions are controlled on the basis of player inputs, a plurality of parts corresponding to parts of the range of the enemy character object, as well as the body corresponding to the entire range of the enemy character object, are set. The hit determination unit 105 determines whether or not the attack range of the player character object overlaps the range of the body of the enemy character object, and also determines whether or not the attack range overlaps the range of each part of the enemy character object, and determines that the attack has hit the part with which it is determined that the attack range overlaps. That is, the hit determination unit 105 determines whether or not the attack by the player character object has hit for each of the plurality of parts of the enemy character object.

The parameter update unit 106 updates various kinds of parameters, such as the level of the player, an experience value, and the sum of money possessed, in the case where an update condition in accordance with the kinds of parameters is satisfied. In particular, for each of a plurality of kinds of characters, hit points (life or stamina) are set as a parameter with which the activities of the character are disabled when the value of the parameter has become zero. When it is determined that an attack on a character has hit, the parameter update unit 106 decreases the hit points of the attacked character. Furthermore, when an item or magic for recovering the hit points is used, the parameter update unit 106 increases the hit points of the character associated with the use of the item or magic.

In this embodiment in particular for the enemy character described earlier, hit points are set individually for the plurality of parts of the enemy character object, and when it is determined that an attack on one of the parts of the enemy character object has hit, the parameter update unit 106 decreases the hit points of the attacked part. Furthermore, when an item or magic for recovering the hit points of the enemy character is used, the parameter update unit 106 increases the hit points of the part associated with the use of the item or magic. That is, the parameter update unit 106 updates the parameter for each of the plurality of parts of the enemy character object.

The image generation unit 108 executes processing for rendering a game image in the rendering buffer 64 on a per-frame basis on the basis of player inputs detected by the player-input detection unit 50, data received by the communication unit 66, the results of various kinds of processing executed by the information processing unit 100, in particular, the results of various kinds of processing executed by the display control unit 104, programs and data loaded into the main storage unit 62, etc., thereby generating game images in which various kinds of objects and various kinds of prerendering images are displayed, and outputs the generated game images to the display unit 52, whereby the game images are displayed.

Specifically, in the case where a three-dimensional game image is to be generated, the image generation unit 108 first obtains object data (model data) from the main storage unit 62, the object data including vertex data (position coordinates, texture coordinates, color data, normal vectors, α values, or the like of vertices) of the individual vertices of objects (models), and executes vertex processing (shading by means of a vertex shader) on the basis of vertex data included in the obtained object data.

In the vertex processing, vertex movement processing as well as geometric processing such as coordinate transformation (world coordinate transformation or camera coordinate transformation), clipping processing, or perspective transformation are executed according to a vertex processing program (vertex shader program), and the vertex data given for the set of vertices constituting the objects are changed (updated or adjusted) on the basis of the results of the processing. Then, rasterization (scanning transformation) is performed on the basis of the vertex data after the vertex processing, whereby polygon (primitive) faces and pixels are associated. Then, following the rasterization, pixel processing (shading by means of a pixel shader or fragment processing) for rendering pixels constituting an image (fragments constituting a display screen) is executed.

In the pixel processing, various kinds of processing are executed according to a pixel processing program (pixel shader program), such as texture reading (texture mapping), setting or changing of color data, semitransparent combination, and anti-aliasing, whereby the colors for rendering the pixels constituting an image are determined. Then, the colors for rendering objects that have been subjected to perspective transformation are output (rendered) to a rendering target (the rendering buffer 64, which is capable of storing image information on a per-pixel basis). That is, in the pixel processing, per-pixel processing for setting or changing image information (color, normal, α value, or the like) on a per-pixel basis is executed. Thus, an image as viewed from a virtual camera (given viewpoint) in the object space is generated.

Then, the image generation unit 108 executes geometric processing, texture mapping, hidden surface removal, a blending, etc. when rendering the objects.

In the geometric processing, processing such as coordinate transformation, clipping processing, perspective projective transformation, or light source calculation is executed for the objects. Then, the object data (position coordinates, texture coordinates, color data, normal vectors, α values, or the like of the vertices of the objects) after the geometric processing (after the perspective projective transformation) are saved in the main storage unit 62.

The texture mapping is processing for mapping the texture (texel values or UV coordinate values) stored in the main storage unit 62 to the objects. Specifically, textures (surface properties such as colors or α values) are read from the main storage unit 62 by using the texture coordinates or the like set (given) to the vertices of the objects. Then, the textures, which constitute a two-dimensional image, are mapped to the objects. In this case, processing for associating pixels and texels, as well as bilinear interpolation, trilinear interpolation, or the like for interpolating texels, are executed.

The sound generation unit 110 executes sound processing on the basis of the results of various kinds of processing executed by the information processing unit 100, thereby generating game sound such as BGM, sound effects, or voices, and outputs the game sound to the sound output unit 54.

The communication control unit 112 executes processing for causing the communication unit 66 to carry out communication with the server device 12 or the other terminal devices 14 to send and receive various kinds of information. For example, the communication control unit 112 causes the communication unit 66 to send or receive information needed in processing for newly registering the player in the information processing system 10, information needed in processing for allowing the player to log into the information processing system 10, information needed in processing for setting a counterpart player who cooperates with or battles against the player who has logged in, information needed in processing for synchronizing the plurality of terminal devices 14, information needed in processing for executing a common game at the plurality of terminal devices 14, etc. Furthermore, the communication control unit 112 also causes the communication unit 66 to send or receive destination information indicating a destination of information, source information indicating a source of information, identification information for identifying the information processing system 10 that has generated information, etc.

2. Control Method According to this Embodiment

A control method according to this embodiment will be described below in detail in the context of an example where a game program according to this embodiment is applied as a game app for smartphones (the terminal devices 14).

The game program according to this embodiment is configured so that a player can play an action RPG in which the player causes a player character (first character) to move or perform actions by performing inputs via swiping or tapping on a touchscreen display of a smartphone, thereby playing a battle against an enemy character (second character) while consuming a parameter, such as hit points, and clears a quest while increasing parameters, such as the level and the sum of money possessed, or acquiring items in accordance with the result of the battle.

Specifically, in this embodiment, first, a player organizes a party constituted of one player character and three non-player characters including first to third non-player characters. Then, when the player causes the player character to move or to perform an action, the three non-player characters are automatically controlled to move or to perform actions, whereby the party battles against the enemy character.

Furthermore, in this embodiment, in addition to solo-player quests, in which a party of one player at one terminal device 14 battles against the enemy character, multi-player quests, in which individual parties of four players at four terminal devices 14 at most cooperatively battle against the enemy character, are prepared. Furthermore, in the multi-player quests, communication is carried out between a local terminal, which is a player's own terminal device 14, and the server device 12 (external network), and communication is also carried out between other terminals, which are the other terminal devices 14 (external network), and the server device 12, whereby four parties, i.e., sixteen characters at most, are disposed in a common object space, allowing the characters to battle against one enemy character disposed in the common object space.

FIGS. 3 to 9 show example game images that are displayed in a display area 200 of a touchscreen display of a smartphone by the game program according to this embodiment.

In this embodiment, as the method for participating in a multi-player quest, it is possible to select either a method in which a player sets up a room by acting as a host by himself or herself and accepts participation by other players or a method in which a player participates in a room set up by another player acting as a host. Furthermore, to the terminal of the first player, who participated first as the host of the room, player number information corresponding to the first player is assigned. To the terminal of the second player, who participated in the room second, player number information corresponding to the second player is assigned. To the terminal of the third player, who participated in the room third, player number information corresponding to the third player is assigned. To the terminal of the fourth player, who participated in the room fourth, player number information corresponding to the fourth player is assigned.

Figure 3:
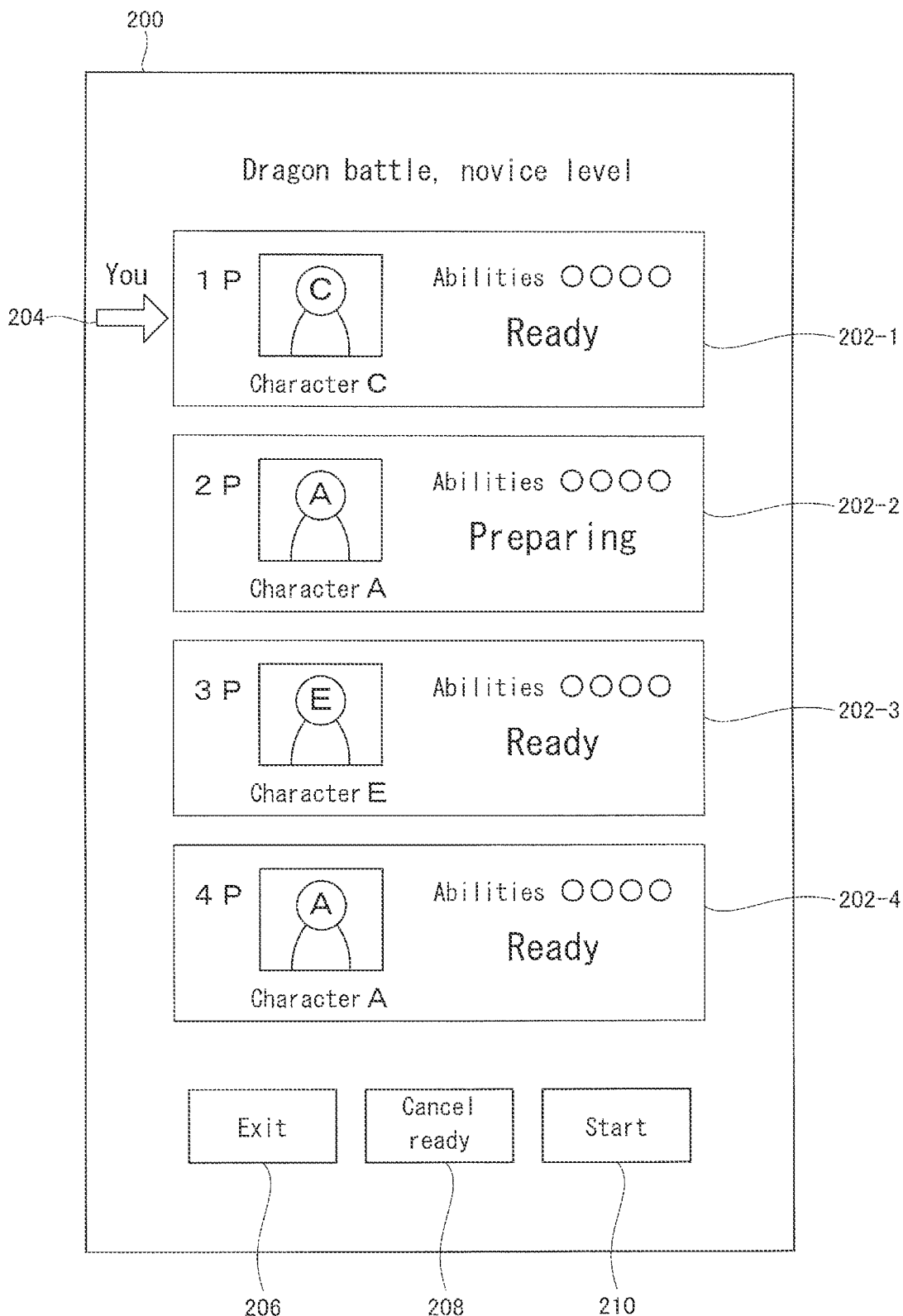
FIG. 3 shows an image that is displayed in a display area of the terminal device in the embodiment of the present invention.

Then, irrespective of which participation method is selected, as shown in FIG. 3, a waiting image is displayed, the waiting image indicating that participation by other players who play battles in cooperation is being awaited. In this embodiment, as multi-player quests, a plurality of kinds of quests with different kinds of enemy characters to battle against and with different difficulty levels are prepared. FIG. 3 shows an example waiting image that is displayed in the case where "dragon battle, novice level", which is a novice-level quest of battling against a dragon, is selected.

Furthermore, in the waiting image, a first waiting indication 202-1 labeled as "1P" correspondingly to the first player and representing the player character of the first player, a second waiting indication 202-2 labeled as "2P" correspondingly to the second player and representing the player character of the second player, a third waiting indication 202-3 labeled as "3P" correspondingly to the third player and representing the player character of the third player, and a fourth waiting indication 202-4 labeled as "4P" correspondingly to the fourth player and representing the player character of the fourth player are displayed.

In the example in FIG. 3, as a result of four players participating in the room, the first waiting indication 202-1 to the fourth waiting indication 202-4 are displayed. Furthermore, since the player character of the second player and the player character of the fourth player are both character A, character A is shown in both the second waiting indication 202-2 and the fourth waiting indication 202-4. Note that, for example, in the case where three players participate in the room, the first waiting indication 202-1 to the third waiting indication 202-3 are displayed.

Furthermore, in the waiting image, an index 204 indicating the waiting indication 202 corresponding to the player at the local terminal is displayed on the left side of one of the first waiting indication 202-1 to the fourth waiting indication 202-4. In the example in FIG. 3, since the player at the local terminal is the first player, the index 204 is displayed on the left side of the first waiting indication 202-1.

Furthermore, in the waiting image, an exit button 206 and a preparation button 208 are displayed below the fourth waiting indication 202-4. When the player taps the exit button 206, the player exits the room, and the participation in the multi-player quest is cancelled.

Furthermore, in the initial state of the waiting screen, "preparing" is indicated in each of the waiting indications 202, and "ready" is indicated in the preparation button 208. When the player taps the preparation button 208 in the state where "ready" is indicated in the preparation button 208, "ready" is indicated in the waiting indication 202 of the player at the local terminal, and the indication in the preparation button 208 is changed to "cancel ready". When the player taps the preparation button 208 in the state where "cancel ready" is indicated in the preparation button 208, "preparing" is indicated in the waiting indication 202 of the player at the local terminal, and the indication in the preparation button 208 is changed to "ready".

In the example in FIG. 3, as the player at the local terminal has already tapped the preparation button 208, "ready" is indicated in the waiting indication 202 of the player at the local terminal, and "cancel ready" is indicated in the preparation button 208. Furthermore, in the example in FIG. 3, as the second player has not tapped the preparation button 208 yet or the second player has tapped the preparation button 208 again in the state where "cancel ready" is indicated in the preparation button 208, "preparing" is indicated in the second waiting indication 202-2.

Furthermore, in this embodiment, a start button 210 is displayed only at the terminal of the first player in addition to the exit button 206 and the preparation button 208. When the first player taps the start button 210, a multi-player quest is played by players indicated as "ready" in the waiting indications 202 thereof at that timing.

Figure 4:
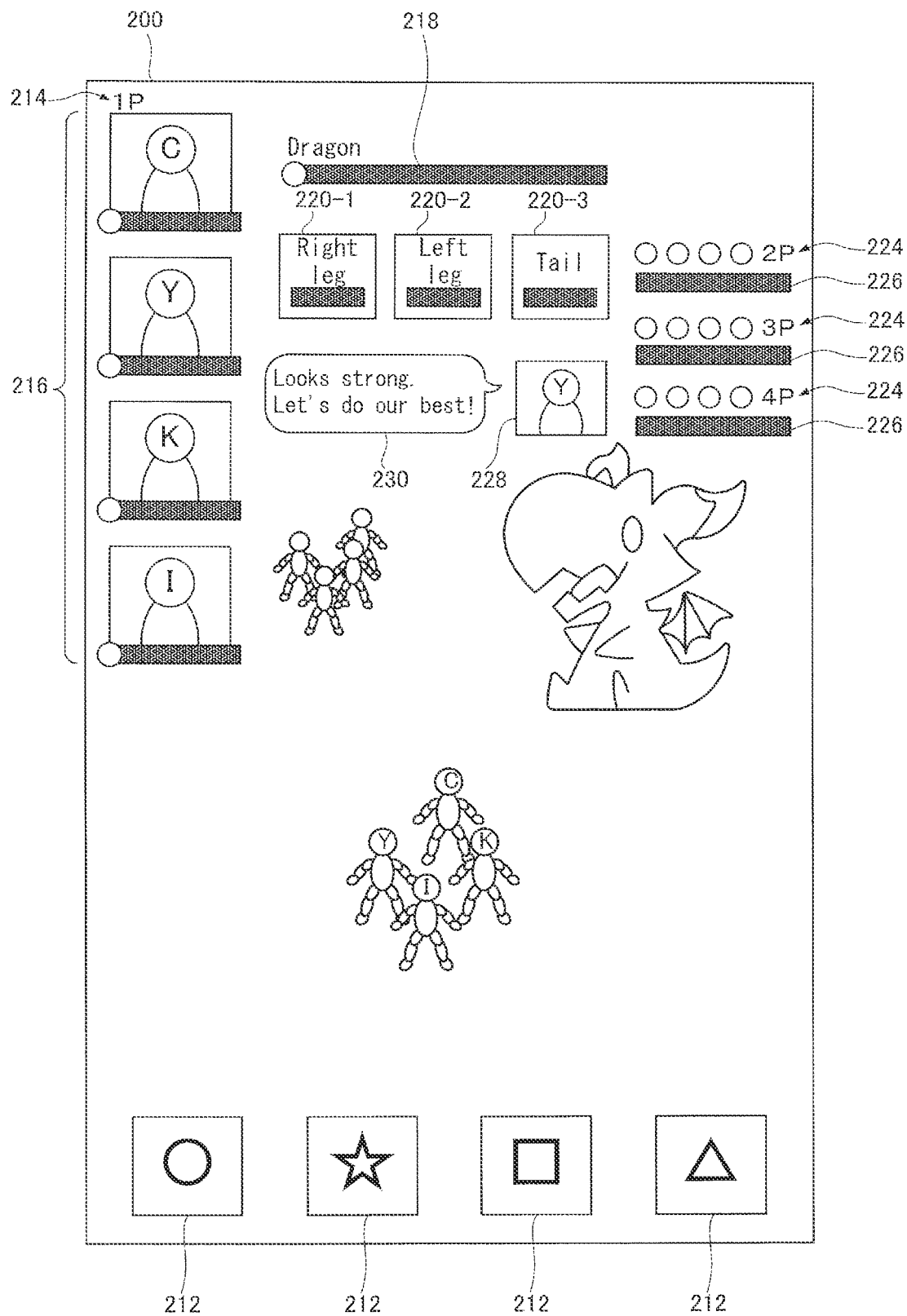
FIG. 4 shows an image that is displayed in the display area of the terminal device in the embodiment of the present invention.

FIG. 4 shows an example quest image that is displayed in the multi-player quest. In the quest image in the example in FIG. 4, a dragon is displayed as the enemy character in "dragon battle, novice level". Furthermore, on the front side of the dragon, as the party of the player at the local terminal, character C, which is the player character of the local terminal, is displayed, and character Y, which is the first non-player character of the local terminal, character K, which is the second non-player character of the local terminal, and character I, which is the third non-player character of the local terminal, are displayed around character C.

Furthermore, in the example in FIG. 4, as a result of four players participating in the multi-player quest, four parties are disposed in the common object space. The party of the second player is displayed on the rear left side of the party of the player, but the party of the third player and the party of the fourth player are not displayed since these parties are not present in the display range at the local terminal in FIG. 4.

Furthermore, in the quest image, a plurality of skill buttons 212 are displayed in a lower part of the display area 200. When the player taps one of the plurality of skill buttons 212, the character of the local terminal is controlled to perform a special action in accordance with the kind of the tapped skill button 212; for example, the character of the local terminal performs a special attack, or the hit points of the character of the local terminal are recovered.

Furthermore, in the quest image, in the top left part of the display area 200, a local-terminal player number 214, indicating which of the first player to the fourth player is the player at the local terminal, is displayed. In the example in FIG. 4, since the player at the local terminal is the first player, "1P", which corresponds to the first player, is displayed as the local-terminal player number 214.

Then, under the player number, a local-terminal HP indication 216 is displayed, which indicates the hit points of the player character of the local terminal, the hit points of the first non-player character of the local terminal, the hit points of the second non-player character of the local terminal, and the hit points of the third non-player character of the local terminal individually.

In the example in FIG. 4, the hit points of character C, the hit points of character Y, the hit points of character K, and the hit points of character I are indicated in the local-terminal HP indication 216.

In this embodiment, each time the part corresponding to the player character is tapped in the local-terminal HP indication 216, player character information (player information) corresponding to the player character of the local terminal is changed to character information corresponding to another character belonging to the party. For example, in the example in FIG. 4, when the part corresponding to character C, which is the current player character, is tapped in the local-terminal HP indication 216, the player character information is changed from the character information corresponding to character C to the character information corresponding to character Y, which has been the first non-player character.

Furthermore, in the quest image, an enemy HP indication 218 indicating the hit points of the body of the enemy character is displayed at the top center of the display area 200. Under the enemy HP indication 218, a first-part HP indication 220-1 (specific indication) indicating the hit points of a first part of the enemy character, a second-part HP indication 220-2 (specific indication) indicating the hit points of a second part of the enemy character, and a third-party HP indication 220-3 (specific indication) indicating the hit points of a third part of the enemy character are displayed.

In the example in FIG. 4, the hit points of the body of the dragon, which is the enemy character, are indicated in the enemy HP indication 218. With the dragon, the right leg is set as the first part, the left leg is set as the second part, and the tail is set as the third part. Thus, "right leg" is indicated in the first-part HP indication 220-1 correspondingly to the first part of the dragon, "left leg" is indicated in the second-part HP indication 220-2 correspondingly to the second part of the dragon, and "tail" is indicated in the third-part HP indication 220-3 correspondingly to the third part of the dragon.

Furthermore, on the right side of the third-part HP indication 220-3, in association with an other-terminal player number 224 indicating which of the first player to the fourth player is the player of each of the other terminals participating in the quest, an other-terminal HP indication 226 indicating the sum of the hit points of the four individual characters belonging to the party of the player at the other terminal, i.e., the hit points of the party of the player at the other terminal, is displayed.

In the example in FIG. 4, since the players at the other terminals are the second player to the fourth player, an other-terminal HP indication 226 indicating "2P" as an other-terminal player number 224 correspondingly to the second player and indicating the hit points of the party of the second player, an other-terminal HP indication 226 indicating "3P" as an other-terminal player number 224 correspondingly to the third player and indicating the hit points of the party of the third player, and an other-terminal HP indication 226 indicating "4P" as an other-terminal player number 224 correspondingly to the fourth player and indicating the hit points of the party of the fourth player are displayed.

Furthermore, when or immediately after the multi-player quest is started, a character icon 228 corresponding to the first non-player character of the local terminal is displayed under the third-part HP indication 220-3, a words indication 230 indicating words of the first non-player character of the local terminal is automatically displayed on the left side of the character icon 228, and the voice for the words of the first non-player character of the local terminal is output. In the example in FIG. 4, a character icon 228 corresponding to character Y and a words indication 230 indicating words of character Y are displayed, and the voice for the words of character Y is output.

Furthermore, when the output of the voice for the words of the first non-player character of the local terminal is finished, a battle against the enemy character is started, and control is exercised as follows. When the player performs a swipe in the display area 200 in a region other than the region where GUIs such as the skill buttons 212 are displayed in the display area 200, the player character moves.

When the player performs a tap in that region, the player character performs an attacking action. When the player taps one of the plurality of skill buttons 212, the player character or non-player character corresponding to the tapped skill button 212 performs a corresponding special action.

Specifically, in this embodiment, when the player performs a swipe in the display area 200 other than the region where GUIs are displayed, the orientation and moving direction of the player character are determined on the basis of the swipe direction, and the moving speed of the player character is determined on the basis of the swipe distance. Furthermore, when the player performs a tap in the display area 200 other than the region where GUIs are displayed, the attacking direction of the player character is determined on the basis of the orientation of the player character at that timing.

Furthermore, when the player character moves, the first non-player character to the third non-player character of the local terminal are controlled to individually move so as to basically follow the player character, while automatically performing attacking actions on the enemy character. Then, the enemy character is also controlled so as to automatically move or perform attacking actions on the parties of the individual players.

Then, when it is determined that an attack by the enemy character has hit one of the player character and the first non-player character to the third non-player character of the local terminal, the local-terminal HP indication 216 is updated so as to decrease the hit points of the character hit by the attack by the enemy character.

Furthermore, in this embodiment, per predetermined period (e.g., 0.5 seconds), hit point information corresponding to the individual hit points of the player character and the first non-player character to the third non-player character of the local terminal, as well as the player number information of the local terminal, are sent to the server device 12, and the hit point information and the player number information of the local terminal are sent from the server device 12 to each of the other terminals participating in the quest. Similarly, on a per-frame basis, the hit point information and the player number information of the individual other terminals participating in the quest are sent from the individual other terminals to the server device 12, and the hit point information and the player number information of the individual other terminals participating in the quest are sent from the server device 12 to the individual terminals other than the source.

Then, when the hit point information and the player number information of the other terminals are received from the server device 12 at the local terminal, the other-terminal HP indications 226 are updated so that the hit points of the parties of the other terminals corresponding to the received player number information change in accordance with the received hit point information.

Meanwhile, when it is determined that an attack by the party of the local terminal or one of the parties of the other terminals has hit the enemy character, the enemy HP indication 218 is updated so as to decrease the hit points of the enemy character. In particular, in this embodiment, when it is determined that an attack by the party of the local terminal or one of the parties of the other terminals has hit the body of the enemy character, the enemy HP indication 218 is updated so as to decrease the hit points of the enemy character. When it is determined that an attack by the party of the local terminal or one of the parties of the other terminals has hit one of the first part, the second part, and the third part of the enemy character, the enemy HP indication 218 is updated so as to decrease the hit points of the enemy character, and one of the first-part HP indication 220-1, the second-part HP indication 220-2, and the third-part HP indication 220-3 is updated so as to decrease the hit points of the part hit by the attack by the party of the local terminal or one of the parties of the other terminals (the part for which a given condition is satisfied as a result of an action of the first character).

Figure 5:
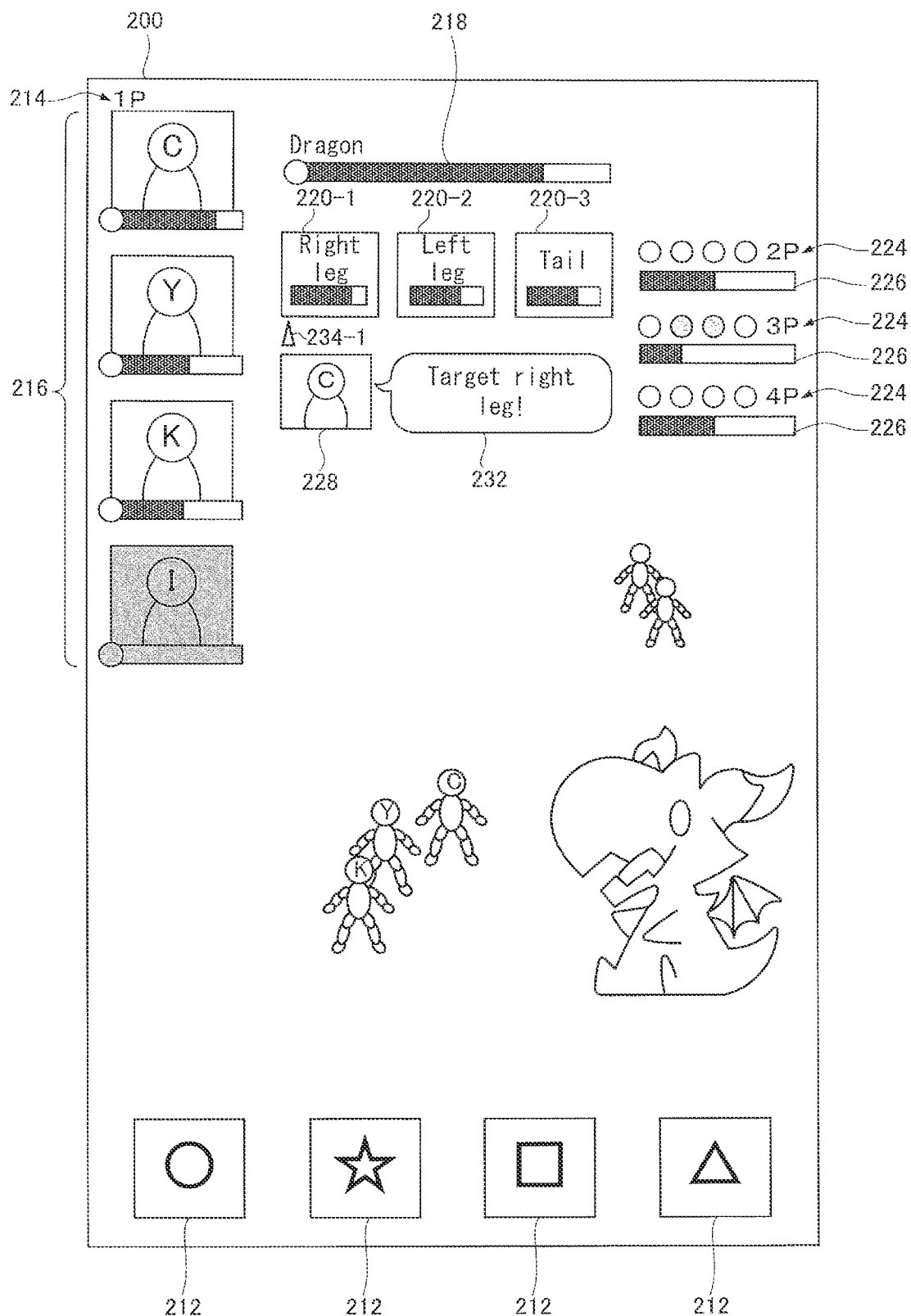
FIG. 5 shows an image that is displayed in the display area of the terminal device in the embodiment of the present invention.

Thus, before the battle against the enemy character is started, the individual hit points in the local-terminal HP indication 216, the enemy HP indication 218, the first-part HP indication 220-1, the second-part HP indication 220-2, the third-part HP indication 220-3, and the individual other-terminal HP indications 226 indicate full states, as shown in FIG. 4, and as the battle against the enemy character proceeds, the individual hit points in the local-terminal HP indication 216, the enemy HP indication 218, the first-part HP indication 220-1, the second-part HP indication 220-2, the third-part HP indication 220-3, and the individual other-terminal HP indications 226 indicate decreased states, as shown in FIG. 5.

Furthermore, in the example in FIG. 5, as a result of the hit points of character I becoming zero, character I being the third non-player character of the local terminal, character I is not present in the object space, and the color of the part indicating the hit points of character I in the local-terminal HP indication 216 has been changed to gray.

Furthermore, as a result of the hit points of the first non-player character and the second non-player character of the third player among the players at the other terminals becoming zero, the first non-player character and the second non-player character of the third player are not present in the object space, and the colors of the parts indicating the presence of the first non-player character and the second non-player character in the other-terminal HP indication 226 of the third player have been changed to gray.

Here, in this embodiment, it is possible to win a battle and clear a quest when the hit points of the body of the enemy character become zero, but there are cases where the hit points of one of the parts of the enemy character become zero before the hit points of the body of the enemy character become zero. Furthermore, in this embodiment, it is dictated that it is not possible to win a battle unless the hit points of the body of the enemy character become zero even if the hit points of the individual parts become zero but that the ability parameters of the enemy character, such as the attacking ability, the defensive ability, and the moving ability decrease, the moving pattern or action pattern of the enemy character changes, or items or additional reward are assigned in accordance with parts with which the hit points have become zero.

Thus, in this embodiment, it is possible to advantageously proceed with the game by communicating intents with the players at the other terminals and performing attacks targeting a specific part of the enemy character, thereby making the hit points of the specific part zero.

In action RPGs such as the one in this embodiment, however, it is difficult to cause the player character to move or to take actions while, for example, entering text in order to communicate intents with the players at the other terminals. Furthermore, there are players who feel it is bothersome to perform voice chats with unacquainted players.

Thus, in this embodiment, when the player taps the part-HP indication 220 corresponding to a part to attack (specific player input) among the first-part HP indication 220-1 to the third-part HP indication 220-3, a character icon 228 corresponding to the player character at the local terminal (player indication) is displayed under the first-part HP indication 220-1, a part-information indication 232 (part indication) indicating that the part of the enemy character corresponding to the tapped part-HP indication 220 is to be attacked is displayed on the right side of the character icon 228 as a words indication 230 of the player character at the local terminal, and a designation indication 234 indicating which player has performed the tap is displayed immediately under the tapped part-HP indication 220, as shown in FIG. 5.

In the example in FIG. 5, as a result of the player tapping the first-part HP indication 220-1, a character icon 228 corresponding to character C is displayed, a part information indication 232 saying "target right leg!", indicating that the "right leg" is to be attacked, is displayed, and a first designation indication 234-1 in blue, indicating that the tap has been performed by the first player, is displayed immediately under the first-part HP indication 220-1.

Note that in this embodiment, each time the player taps the part corresponding to the player character in the local-terminal HP indication 216, the player character information is changed to character information corresponding to another character belonging to the party, as described earlier, and when the player character information is changed, the character icon 228 is also changed to a character icon 228 corresponding to the changed player character information.

Furthermore, in this embodiment, when the player taps one of the part HP indications 220, part information (specific information) corresponding to the part HP indication 220 tapped at the local terminal, player character information (player information) corresponding to the player character of the local terminal, and player number information (player information) of the local terminal are sent to the server device 12. Then, the part information, the player character information, and the player number information of the local terminal are sent from the server device 12 to the individual other terminals participating in the quest.

Then, when the part information, the player character information, and the player number information of the local terminal are received from the server device 12 by the individual other terminals participating in the quest, at the individual other terminals, the character icon 228 corresponding to the player character of the local terminal is displayed, a part information indication 232 corresponding to the part HP indication 220 tapped at the local terminal is displayed as a words indication 230 of the player character of the local terminal, and a designation indication 234 corresponding to the player number of the local terminal is displayed immediately under the part HP indication 220 tapped at the local terminal.

For example, when the player taps the first-part HP indication 220-1 at the local terminal, as in the example in FIG. 5, also at the other terminals, the character icon 228 corresponding to character C is displayed, the part information indication 232 saying "target right leg!" is displayed, and the first designation indication 234-1 is displayed immediately under the first-part HP indication 220-1.

Furthermore, also at each of the other terminals participating in the quest, when one of the part HP indications 220 has been tapped, a character icon 228 corresponding to the player character of the other terminal at which the part HP indication 220 has been tapped is displayed, a part information indication 232 corresponding to the tapped part HP indication 220 is displayed as a words indication 230 of the player character of the other terminal at which the part HP indication 220 has been tapped, and a designation indication 234 corresponding to the player number of the other terminal at which the part HP indication 220 has been tapped is displayed immediately under the tapped part HP indication 220.

Furthermore, also at each of the other terminals participating in the quest, when one of the part HP indications 220 has been tapped, part information, player character information, and player number information of the other terminal at which the part HP indication 220 has been tapped are sent to the server device 12, the part information, the player character information, and the player number information of the other terminal at which the part HP indication 220 has been tapped is sent from the server device 12 to the terminals other than the other terminal at which the part HP indication 220 has been tapped.

Furthermore, when the part information, the player character information, and the player number information of the other terminal at which the part HP indication 220 has been tapped are received from the server device 12 by the individual terminals other than the other terminal at which the part HP indication 220 has been tapped, at each of the terminals, the character icon 228 corresponding to the player character of the other terminal at which the part HP indication 220 has been tapped is displayed, the part information indication 232 corresponding to the tapped part HP indication 220 is displayed as the words indication 230 of the player character of the other terminal at which the part HP indication 220 has been tapped, and the designation indication 234 corresponding to the player number of the other terminal at which the part HP indication 220 has been tapped is displayed immediately under the tapped part HP indication 220.

Figure 6:
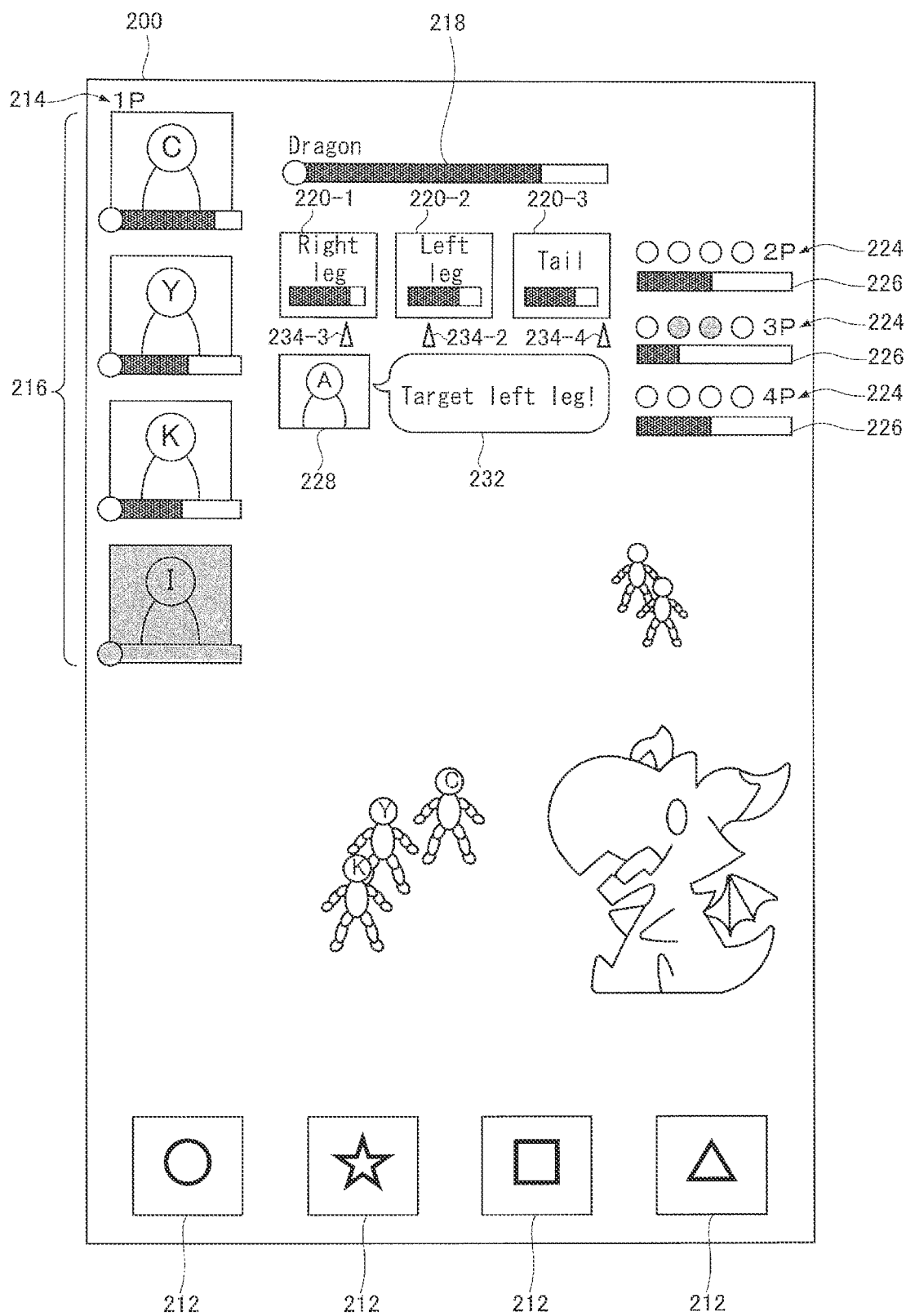
FIG. 6 shows an image that is displayed in the display area of the terminal device in the embodiment of the present invention.

For example, when the second-part HP indication 220-2 has been tapped at the terminal of the second player, at the local terminal, a character icon 228 corresponding to character A, which is the player character of the second player, is displayed, a part information indication 232 saying "target left leg!", indicating that the "left leg" is to be attacked, is displayed, and a second designation indication 234-2 in red, indicating that the tap has been performed by the second player, is displayed immediately under the second-part HP indication 220-2, as shown in FIG. 6.

Here, in this embodiment, it is possible to display a third designation indication 234-3 in yellow, indicating that a tap has been performed by the third player, and a fourth designation indication 234-4 in green, indicating that a tap has been performed by the fourth player, as well as the first designation indication 234-1 and the second designation indication 234-2, immediately under each of the first-part HP indication 220-1 to the third-part HP indication 220-3, as shown in FIG. 6. The left end immediately under each of the first-part HP indication 220-1 to the third-part HP indication 220-3 is the display position of the first designation indication 234-1, the position right adjacent to the first designation indication 234-1 is the display position of the second designation indication 234-2, the position right adjacent to the second designation indication 234-2 is the display position of the third designation indication 234-3, and the position right adjacent to the third designation indication 234-3, i.e., the right end, is the display position of the fourth designation indication 234-4.

Furthermore, in this embodiment, in the waiting image shown in FIG. 3, the indication color of "1P" in the first waiting indication 202-1 and the frame color of the first waiting indication 202-1 are blue, the indication color of "2P" in the second waiting indication 202-2 and the frame color of the second waiting indication 202-2 are red, the indication color of "3P" in the third waiting indication 202-3 and the frame color of the third waiting indication 202-3 are yellow, and the indication color of "4P" in the fourth waiting indication 202-4 and the frame color of the fourth waiting indication 202-4 are green.

Furthermore, in the quest image shown in FIG. 4, etc., the indication color of "1P" indicated as the local-terminal player number 214 is blue, the indication color of "2P" indicated as the other-terminal player number 224 is red, the indication color of "3P" indicated as the other-terminal player number 224 is yellow, and the indication color of "4P" indicated as the other-terminal player number 224 is green.

That is, in this embodiment, the color corresponding to the first player is blue, the color corresponding to the second player is red, the color corresponding to the third player is yellow, and the color corresponding to the fourth player is green. Furthermore, in this embodiment, the color of the first designation indication 234-1 is blue, the color of the second designation indication 234-2 is red, the color of the third designation indication 234-3 is yellow, and the color of the fourth designation indication 234-4 is green.

That is, in this embodiment, each of the first designation indication 234-1 to the fourth designation indication 234-4, by means of the display position and color immediately under each of the first-part HP indication 220-1 to the third-part HP indication 220-3, indicates which player has tapped the part HP indication 220.

As described above, in this embodiment, when one of the first-part HP indication 220-1 to the third-part HP indication 220-3 is tapped at one of the terminals participating in a quest, at each of the terminals participating in the quest, a character icon 228, a part information indication 232, and a designation indication 234 are displayed on the basis of part information, player character information, and player number information of the terminal at which the part HP indication 220 has been tapped. This makes it possible to notify the players at the other terminals of a part that the player wishes to attack.

Here, with a configuration where the character icon 228 and the part information indication 232 change each time one of the part HP indications 220 is tapped at one of the terminals participating in a quest, in the case where different part HP indications 220 are tapped successively at the individual terminals or at one of the terminals, there are cases where the character icon 228 and the part information indication 232 change so frequently that it rather becomes difficult to communicate intents among the players participating in the quest.

Thus, in this embodiment, the display period of the part information indication 232 is set to be five seconds (predetermined time). During the display period of the part information indication 232, an indication-update prohibition flag is turned on, and after the elapse of five seconds since the indication-update prohibition flag being turned on, the character icon 228 and the part information indication 232 are erased, and the indication-update prohibition flag is turned off.

Furthermore, in the case where the indication-update prohibition flag is turned off, when one of the part HP indications 220 is tapped at one of the terminals participating in the quest, a designation indication 234 is displayed immediately under the tapped part HP indication 220, a character icon 228 corresponding to the terminal at which the part HP indication 220 has been tapped is displayed, and a part information indication 232 corresponding to the tapped part HP indication 220 is displayed.

Meanwhile, in the case where the indication-update prohibition flag is turned on (under a predetermined condition), when one of the part HP indications 220 is tapped at one of the terminals participating in the quest, a designation indication 234 is displayed immediately under the tapped part HP indication 220, but neither a character icon 228 corresponding to the terminal at which the part HP indication 220 has been tapped nor a part information indication 232 corresponding to the tapped part HP indication 220 is displayed (a part indication based on further received identification information and player information is not displayed), and the character icon 228 and the part information indication 232 that have already been displayed are continuously displayed.

Figure 7:
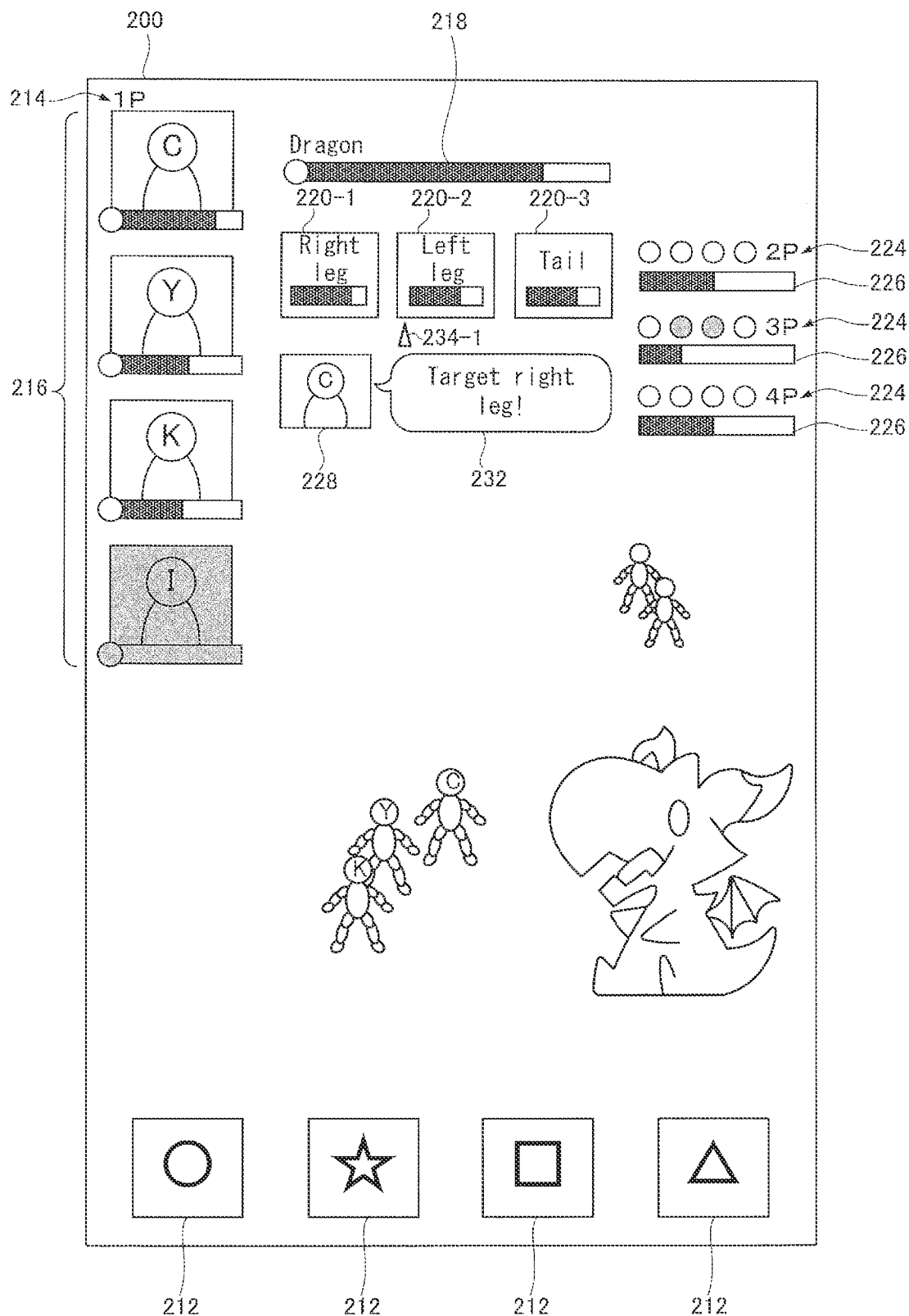
FIG. 7 shows an image that is displayed in the display area of the terminal device in the embodiment of the present invention.

For example, in the state shown in FIG. 5, i.e., in the state where the indication-update prohibition flag is turned on, when the player at the local terminal further taps the second-part HP indication 220-2, the first designation indication 234-1 displayed immediately under the second-part HP indication 220-2 is moved or erased, and the first designation indication 234-1 is displayed immediately under the second-part HP indication 220-2, while the character icon 228 corresponding to character C and the part information indication 232 saying "target right leg!" are displayed continuously, as shown in FIG. 7.

Figure 8:
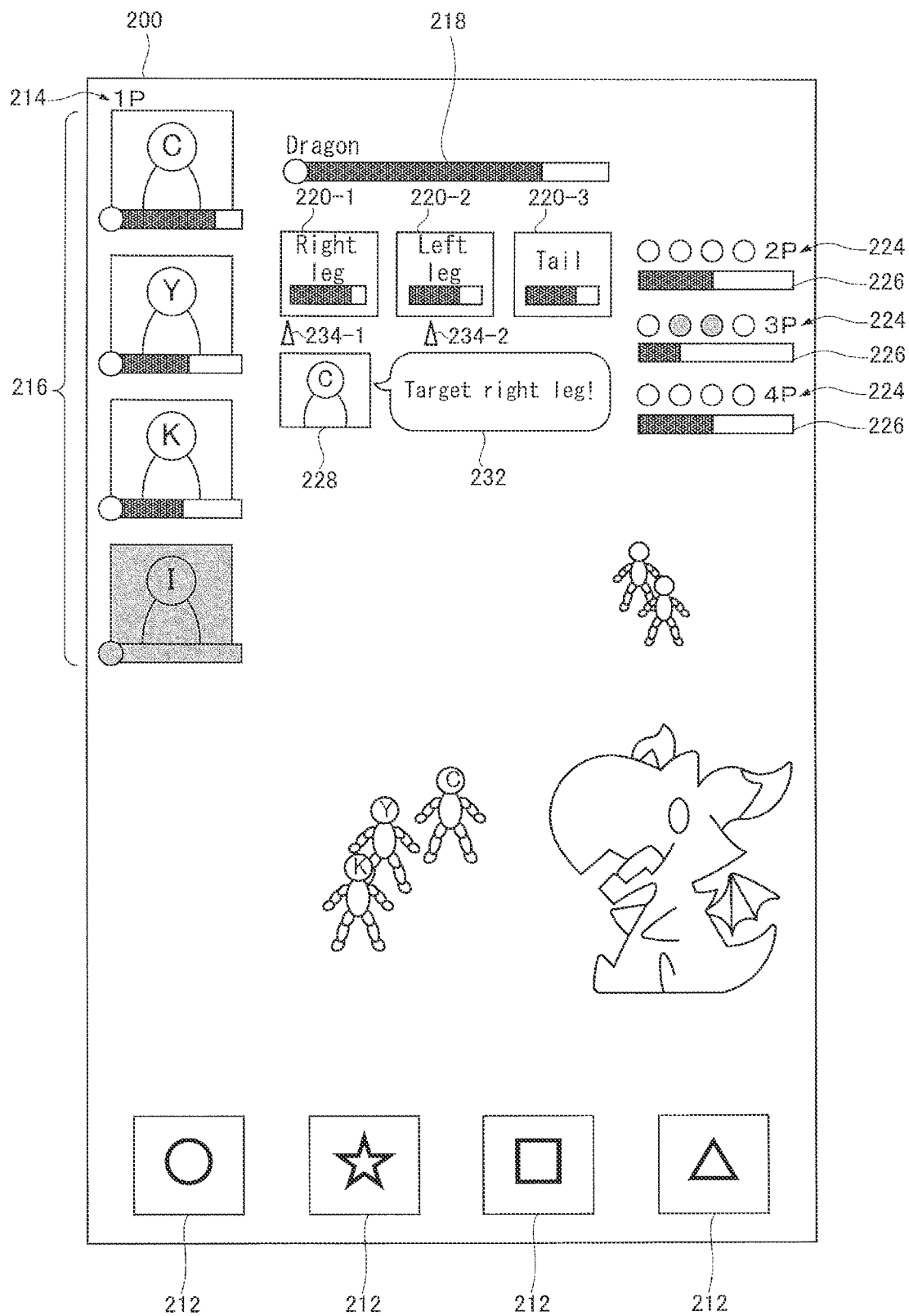
FIG. 8 shows an image that is displayed in the display area of the terminal device in the embodiment of the present invention.

Furthermore, for example, in the state shown in FIG. 5, for example, when the second-part HP indication 220-2 is tapped at the terminal of the second player, the second designation indication 234-2 is displayed immediately under the second-part HP indication 220-2, while the character icon 228 corresponding to character C and the part information indication 232 saying "target right leg!" are displayed continuously, as shown in FIG. 8. Note that in the example in FIG. 8, as a result of the player at the local terminal not having tapped any part HP indication 220 other than the first-part HP indication 220-1 after tapping the first-part HP indication 220-1, or not having tapped any part HP indication 220, the first designation indication 234-1 immediately under the first-part HP indication 220-1 is displayed continuously.

Figure 9:
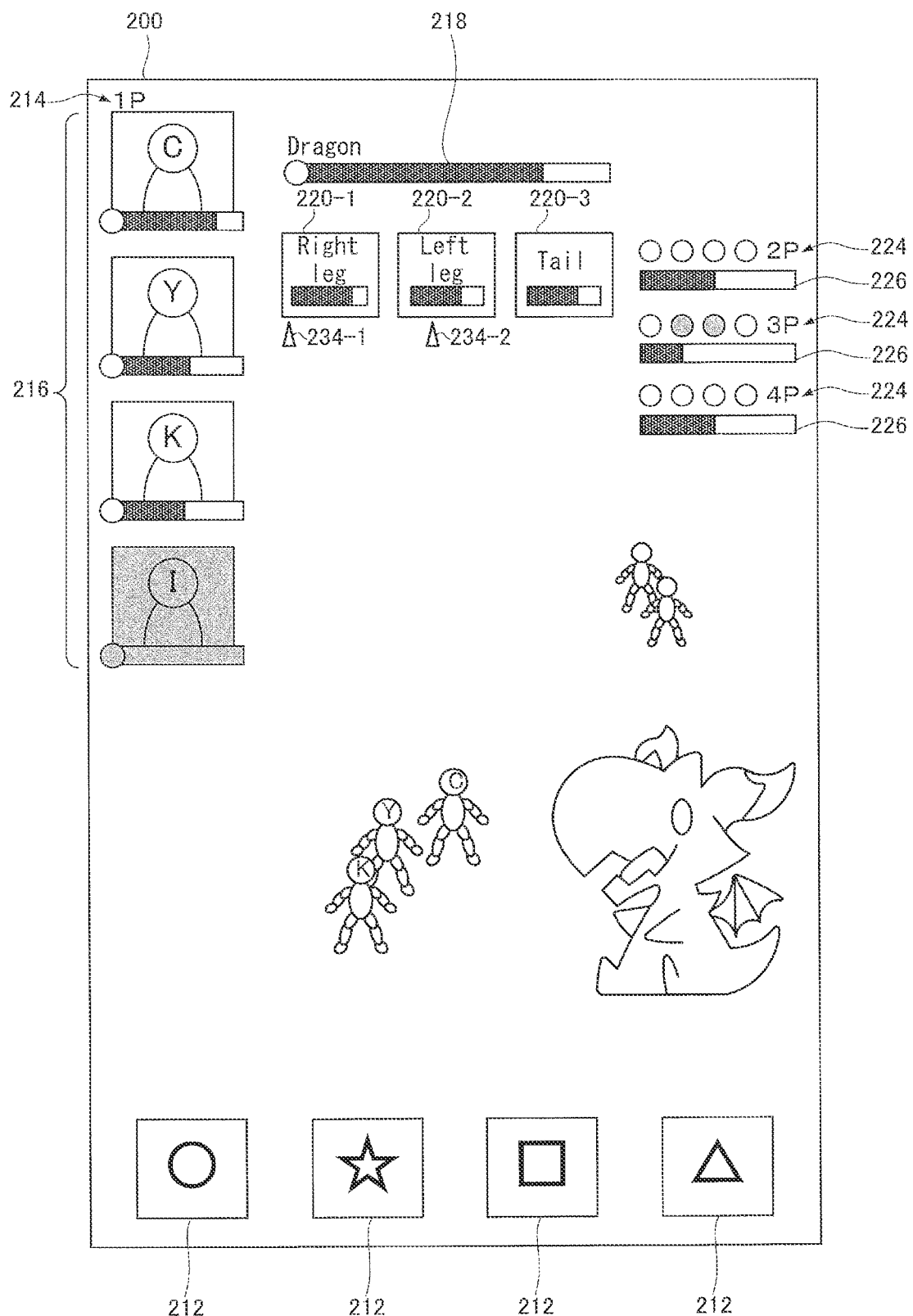
FIG. 9 shows an image that is displayed in the display area of the terminal device in the embodiment of the present invention.

Then, for example, in the state shown in FIG. 8, after the elapse of five seconds since the indication-update prohibition flag being turned on, the character icon 228 and the part information indication 232 are erased, but the first designation indication 234-1 immediately under the first-part HP indication 220-1 and the second designation indication 234-2 immediately under the second-part HP indication 220-2 are displayed continuously, as shown in FIG. 9.

Then, for example in the state shown in FIG. 9, when the second-part HP indication 220-2 is tapped again at the terminal of the second player, the second designation indication 234-2 immediately under the second-part HP indication 220-2 is displayed continuously, while a character icon 228 corresponding to character A and a part information indication 232 saying "target left leg!" are displayed, although not shown.

As described above, in this embodiment, each time one of the part HP indications 220 is tapped at one of the terminals participating in a quest, a designation indication 234 corresponding to the terminal at which the part HP indication 220 has been tapped is moved to immediately under the tapped part HP indication 220, whereas a character icon 228 corresponding to the terminal at which the part HP indication 220 has been tapped and a prat information indication 232 corresponding to the tapped part HP indication 220, once displayed, do not change before the elapse of the display period of five seconds.

Thus, in this embodiment, while the player is allowed to notify the players at the other terminals of a part that the player wishes to attack by tapping one of the first-part HP indication 220-1 to the third-part HP indication 220-3, character icons 228 and part information indications 232 are prevented from changing too frequently. This makes it possible for the players participating in a quest to smoothly communicate intents among each other.

The flow of processing executed by the information processing unit 100 in this embodiment will be described below with reference to flowcharts in FIGS. 10 to 12.

Figure 10:
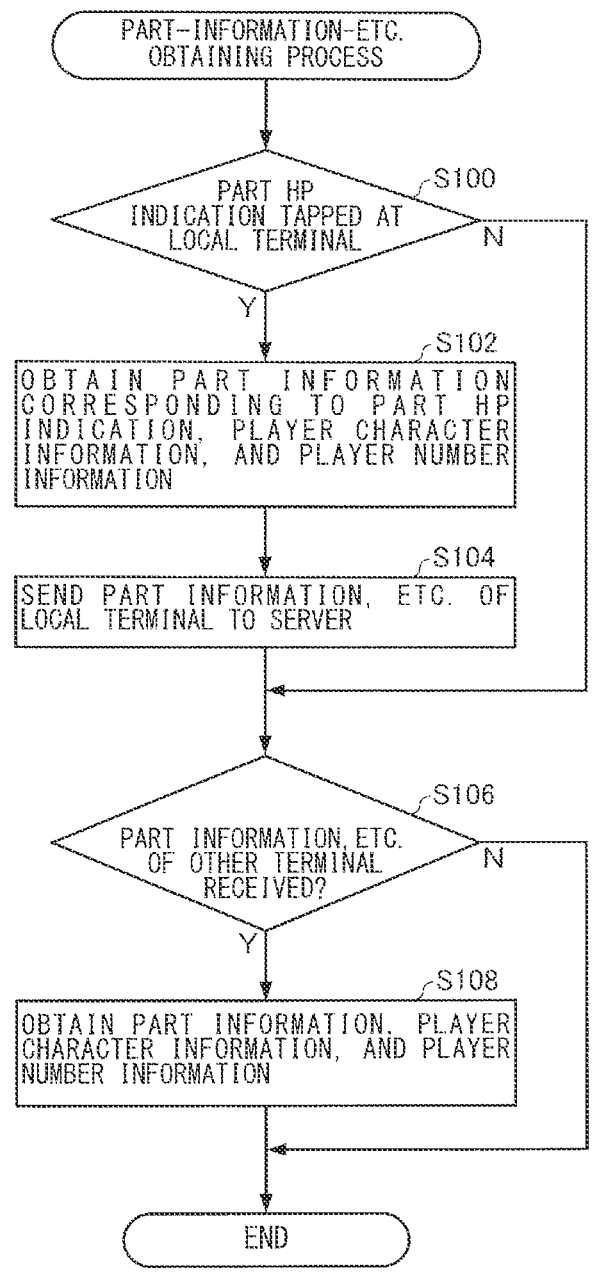
FIG. 10 is a flowchart showing processing at the terminal device in the embodiment of the present invention.

First, in a part-information-etc. obtaining process shown in FIG. 10, when one of the first-part HP indication 220-1 to the third-part HP indication 220-3 is tapped at the local terminal (Y in step S100), the display control unit 104 obtains part information corresponding to the tapped part HP indication 220, player character information of the local terminal, and player number information of the local terminal (step S102). Then, the communication control unit 112 sends the part information, the player character information, and the player number information of the local terminal to the server device 12 (step S104).

Furthermore, when the communication control unit 112 receives part information, player character information, and player number information of the other terminals from the server device 12 (Y in step S106), the display control unit 104 obtains the part information of the other terminals, the player character information of the other terminals, and the player number information of the other terminals (step S108).

Figure 11:
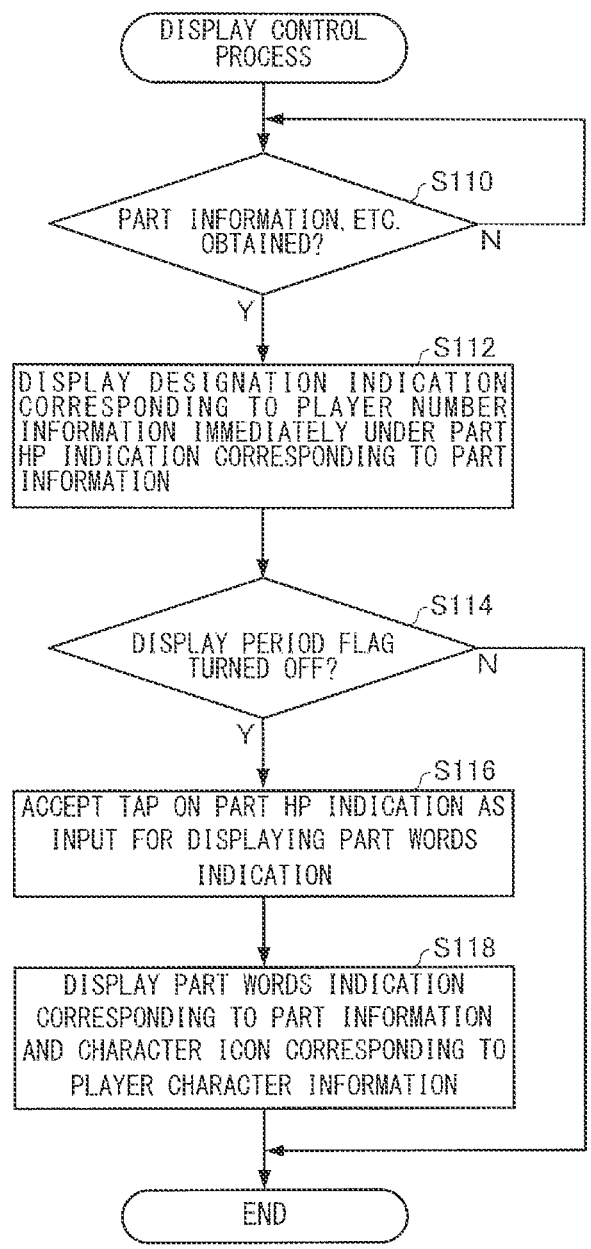
FIG. 11 is a flowchart showing processing at the terminal device in the embodiment of the present invention.

Furthermore, in a display control process shown in FIG. 11, when the display control unit 104 obtains the part information, the player character information, and the player number information of the local terminal or one of the other terminals (Y in step S110), the display control unit 104 displays a designation indication 234 corresponding to the obtained player number information immediately under the part HP indication 220 corresponding to the obtained part information on the basis of the obtained part information and the player number information (step S112).

Then, the display control unit 104 determines whether the indication-update prohibition flag is turned off (step S114). In the case where the indication-update prohibition flag is turned off (Y in step S114), a tap on one of the first-part HP indication 220-1 to the third-part HP indication 220-3 is accepted as an input for displaying a part-information indication 232 (step S116). Then, the display control unit 104 displays a part information indication 232 corresponding to the obtained part information and a character icon 228 corresponding to the obtained player character information on the basis of the obtained part information and player character information (step S118).

Meanwhile, in the case where the indication-update prohibition flag is not turned off (N in step S114), a tap on one of the first-part HP indication 220-1 to the third-part HP indication 220-3 is not accepted as an input for displaying a part information indication 232. Then, the process is terminated immediately, and the character icon 228 and the part information indication 232 that have already been displayed are displayed continuously.

Figure 12:
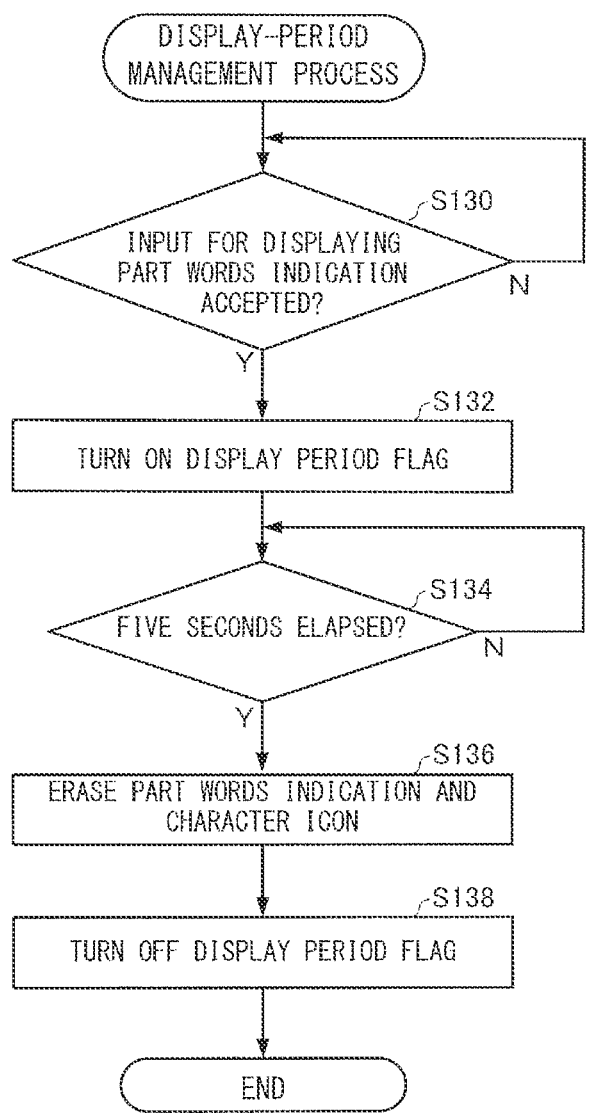
FIG. 12 is a flowchart showing processing at the terminal device in the embodiment of the present invention.

Furthermore, in a display-period management process shown in FIG. 12, when the display control unit 104 accepts a tap on one of the first-part HP indication 220-1 to the third-part HP indication 220-3 as an input for displaying a part information indication 232 (Y in step S130), the indication-update prohibition flag is turned on (step S132). After the elapse of five seconds since the indication-update prohibition flag being turned on (Y in step S134), the part information indication 232 and the character icon 228 are erased (step S136), and the indication-update prohibition flag is turned off (step S138).

3. Modifications

The present invention can be embodied in various forms, without limitation to the embodiment described above, and the following describes modifications thereof. Note that the embodiment described above and various methods described below as modifications can be adopted in combination as appropriate as methods of realizing the present invention.

First, the above-described embodiment has been described in the context of an example where the first-part HP indication 220-1 indicating the hit points of the first part of the enemy character, the second-part HP indication 220-2 indicating the hit points of the second part of the enemy character, and the third-part HP indication 220-3 indicating the hit points of the third part of the enemy character are displayed as a plurality of specific indications; however, the configuration may be such that each of the plurality of specific indications indicates the part to which the specific indication corresponds, such as "right leg", "left leg", or "tail", while not indicating the hit points of the corresponding part. Furthermore, the configuration may be such that each of the plurality of specific indications is formed to have the shape of the corresponding part or colored with the color of the corresponding part, thereby indicating the part to which the specific indication corresponds. For example, the specific indication corresponding to "right leg" may be formed to have the shape of the "right leg", and in the case where the "right leg" of the enemy character is red and the "left leg" thereof is blue, the specific indication corresponding to the "right leg" may be colored red, and the specific indication corresponding to the "left leg" may be colored blue.

Furthermore, although the above-described embodiment has been described in the context of an example where one of the part HP indications 220 is tapped as a specific player input, an operation for designating one of the part HP indications 220 may be performed as a specific player input by using a pointing device, a hardware key, a lever, or the like.

Furthermore, although the above-described embodiment has been described in the context of an example where player character information and player number information are sent and received as player information, terminal identification information for identifying a terminal device 14 may be sent and received as player information. Furthermore, at least one of player character information, player number information, and terminal identification information may be sent and received as player information.

Furthermore, although the above-described embodiment has been described in the context of an example where a character icon 228 corresponding to a player character is displayed as a player indication, at least one of the character icon 228 corresponding to the player character, a player number, a player icon, the name of the player character, the name of the player, and an object colored with a color corresponding to the player may be displayed.

Furthermore, although the above-described embodiment has been described in the context of an example where a part information indication 232 is displayed as a part indication, text indicating only the corresponding part or the shape of the corresponding part may be displayed as a part indication.

Furthermore, although the above-described embodiment has been described in the context of an example where a part information indication 232 is displayed and erased together with a character icon 228 as an example of displaying a part indication in association with a player indication, a player indication of a player participating in a quest may be displayed in advance, and a part indication may be displayed in association with the player indication corresponding to player information on the basis of specific information and the player information.

Figure 13:
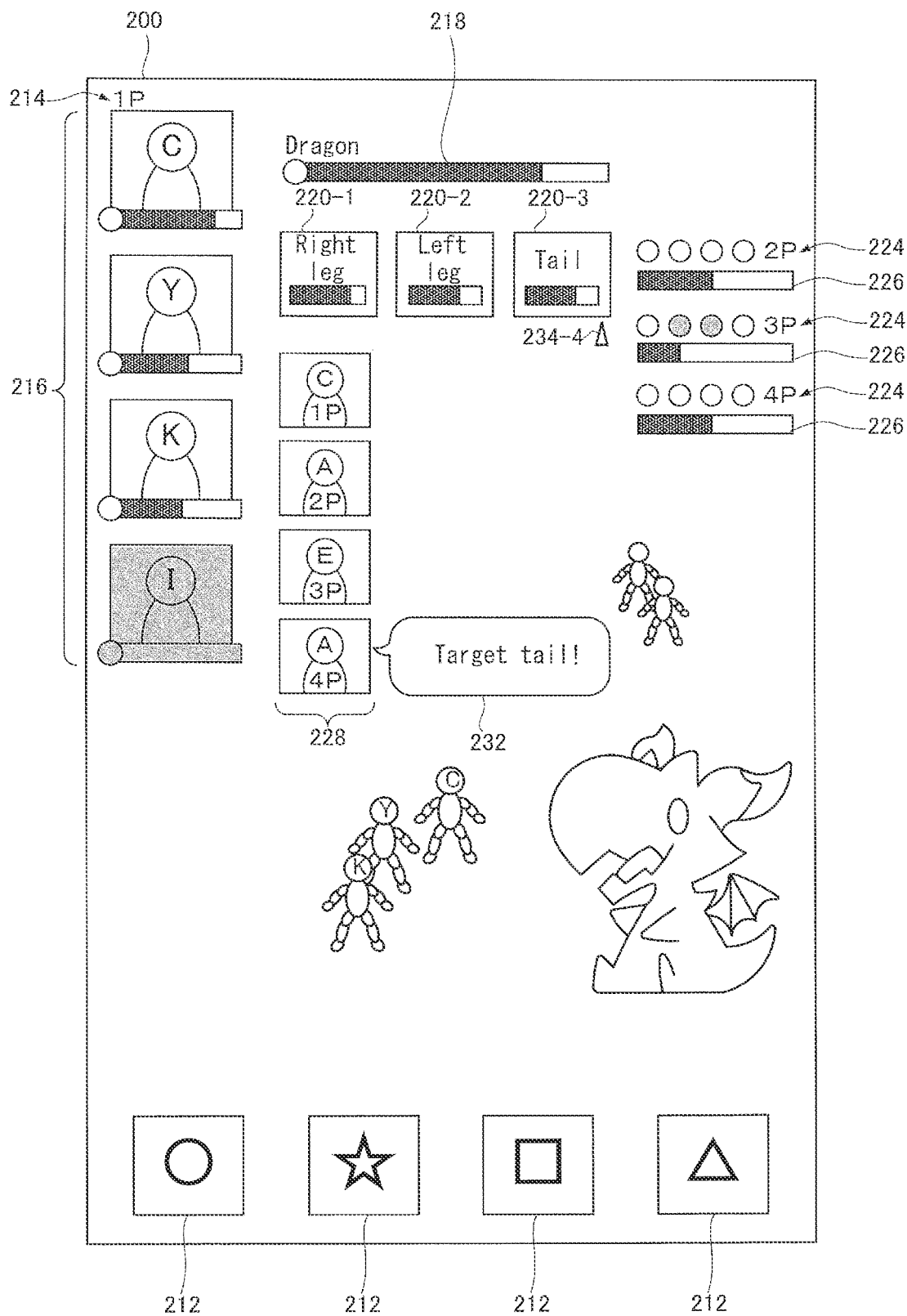
FIG. 13 shows an image that is displayed in the display area of the terminal device in the embodiment of the present invention.

For example, as shown in FIG. 13, a character icon 228 of character C corresponding to the first player, a character icon 228 of character A corresponding to the second player, a character icon 228 of character E corresponding to the third player, and a character icon 228 of character A corresponding to the fourth player may be displayed in advance, and when one of the part HP indications 220 is tapped at one of the terminals participating in a quest, a part information indication 232 corresponding to the tapped part HP indication 220 may be displayed on the right side of the character icon 228 corresponding to the terminal at which the part HP indication 220 has been tapped.

In the example in FIG. 13, as a result of the fourth player tapping the third-part HP indication 220-3, a part information indication 232 saying "target tail!", indicating that the "tail" is to be attacked, is displayed on the right side of the character icon 228 corresponding to character A, and the fourth designation indication 234-4 in green, indicating that a tap has been performed by the fourth player, is displayed immediately under the third-part HP indication 220-3.

Figure 14:
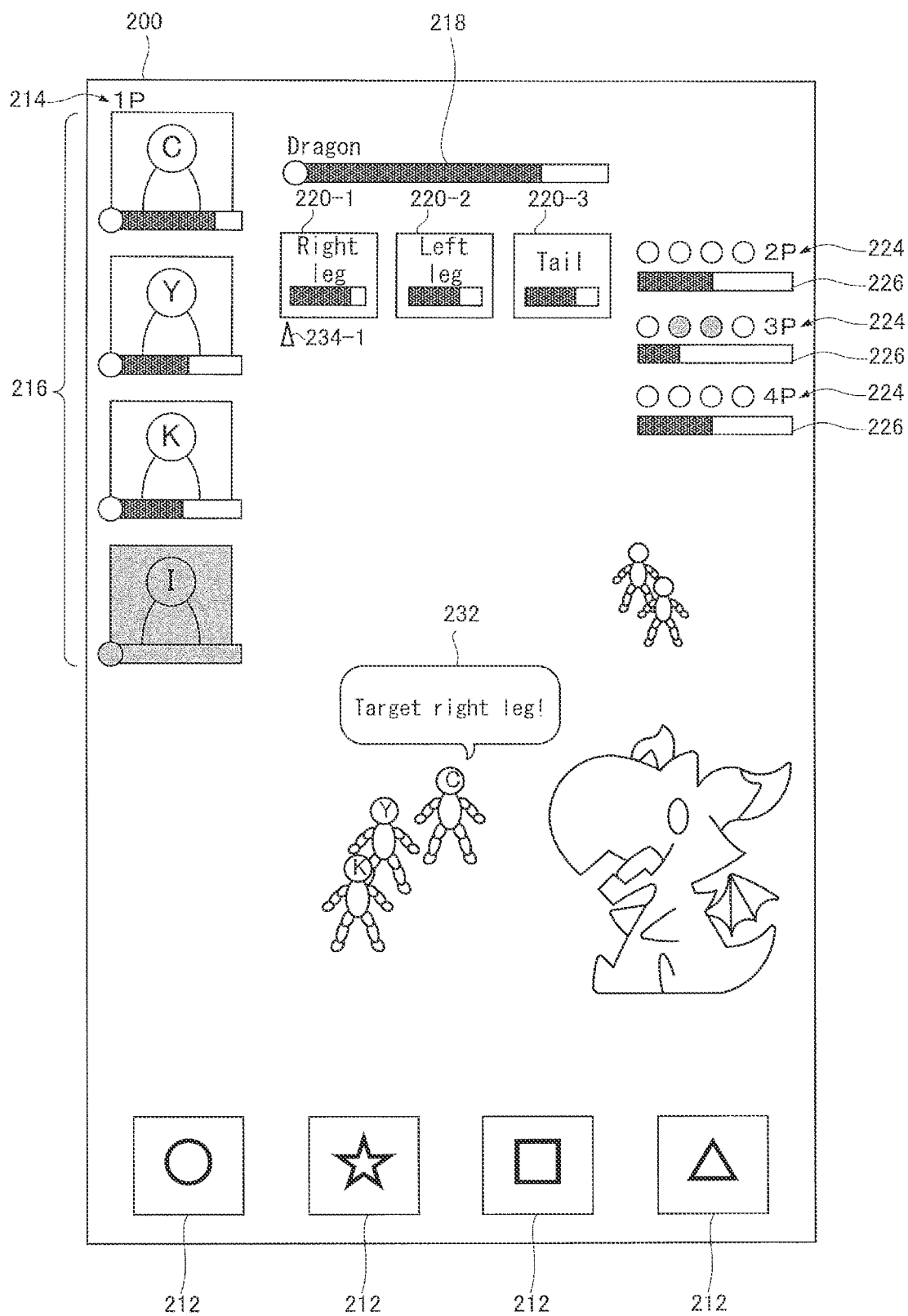
FIG. 14 shows an image that is displayed in the display area of the terminal device in the embodiment of the present invention.

Furthermore, as shown in FIG. 14, while using a player character disposed in the object space as a player indication, a part indication may be displayed in association with a character object of the player character disposed in the object space, on the basis of specific information and player information.

In the example in FIG. 14, as a result of the player at the local terminal, who is the first player, tapping the first-part HP indication 220-1, a part information indication 232 saying "target right leg!" is displayed above the head of character C, and the first designation indication 234-1 in blue, indicating that a tap has been performed by the first player, is displayed immediately under the first-part HP indication 220-1.

Furthermore, the above-described embodiment has been described in the context of an example where a character icon 228 and a part information indication 232 are erased and the indication-update prohibition flag is turned off after the elapse of five seconds since the indication-update prohibition flag being turned on; however, the configuration may be such that the character icon 228 and the part information indication 232 are displayed continuously instead of being erased immediately, while turning off the indication-update prohibition flag, after the elapse of five seconds since the indication-update prohibition flag being turned on. Furthermore, in this example, the configuration may be such that even if a character icon 228 and a part information indication 232 are displayed, in the case where the indication-update prohibition flag is turned off, when one of the part HP indications 220 is tapped at one of the terminals participating in a quest, a designation indication 234 is displayed immediately under the tapped part HP indication 220, the character icon 228 and the part information indication 232 that have been displayed are erased, and a character icon 228 corresponding to the terminal at which the part HP indication 220 has been tapped and a part information indication 232 corresponding to the tapped part HP indication 220 are newly displayed.

Furthermore, although the above-described embodiment has been described in the context of an example where one part information indication 232 is displayed as an example of displaying a predetermined number of part indications, a plurality of part information indications 232 may be displayed.

Figure 15:
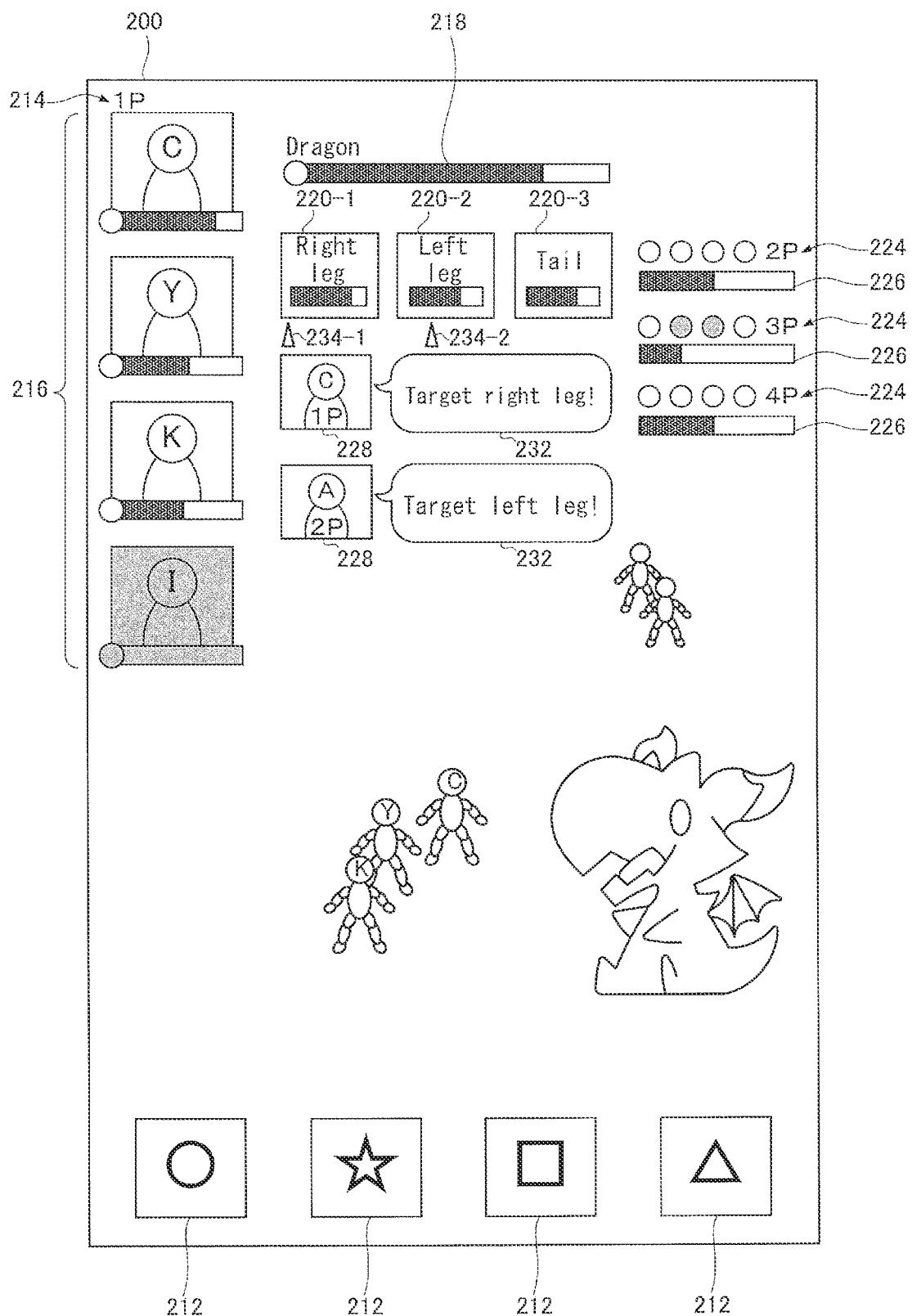
FIG. 15 shows an image that is displayed in the display area of the terminal device in the embodiment of the present invention.

For example, the configuration may be such that when the second-part HP indication 220-2 is tapped in the state shown in FIG. 5, for example, at the terminal of the second player, the second designation indication 234-2 is displayed immediately under the second-part HP indication 220-2, the character icon 228 corresponding to character C of the first player and the part information indication 232 saying "target right leg!" are displayed continuously, and a character icon 228 corresponding to character A of the second player and a part information indication 232 saying "target left leg!" are displayed thereunder, as shown in FIG. 15.

Specifically, in this example, in the case where a character icon 228 and a part information indication 232 are not displayed, when one of the part HP indications 220 is tapped at one of the terminals participating in a quest, a designation indication 234 is displayed immediately under the tapped part HP indication 220, and a character icon 228 corresponding to the terminal at which the part HP indication 220 has been tapped and a part information indication 232 corresponding to the tapped part HP indication 220 are displayed at a first position.

Furthermore, in the case where a character icon 228 and a part information indication 232 are already displayed at the first position, when one of the part HP indications 220 is tapped at one of the terminals participating in a quest, a designation indication 234 is displayed immediately under the tapped part HP indication 220, and a character icon 228 corresponding to the terminal at which the part HP indication 220 has been tapped and a part information indication 232 corresponding to the tapped part HP indication 220 are further displayed at a second position, which is adjacent to the first position.

Furthermore, in this example, the configuration may be such that the display period of each part information indication 232 is set to five seconds so that a character icon 228 and a part information indication 232 will be erased after the elapse of five seconds, and in the case where two sets of character icons 228 and part information indications 232 are displayed, when the character icon 228 and the part information indication 232 displayed earliest among the two sets of character icons 228 and part information indications 232 have been erased from the first position, the character icon 228 and the part information indication 232 displayed next are moved from the second position to the first position.

Furthermore, in this example, the configuration may be such that in the case where two sets of character icons 228 and part information indications 232 are displayed, when one of the part HP indications 220 is tapped at one of the terminals participating in a quest, a designation indication 234 is displayed immediately under the tapped part HP indication 220, a character icon 228 corresponding to the terminal at which the part HP indication 220 has been tapped and a part information indication 232 corresponding to the tapped part HP indication 220 are not displayed, and the already displayed two sets of character icons 228 and part information indications 232 are displayed continuously. That is, the configuration may be such that a maximum of two sets of character icons 228 and part information indications 232 are displayed.

Furthermore, in this example, the configuration may be such that the minimum display period of each part information indication 232 is set to five seconds, a character icon 228 and a part information indication 232 are displayed continuously instead of being erased immediately even after the elapse of the minimum display period, and in the case where two sets of character icons 228 and part information indications 232 are displayed and the minimum display period of the part information indication 232 displayed earliest has elapsed, when one of the part HP indications 220 is tapped at one of the terminals participating in a quest, a designation indication 234 is displayed immediately under the tapped part HP indication 220, the character icon 228 and the part information indication 232 displayed earliest among the two sets of character icons 228 and part information indications 232 are erased from the first position, the character icon 228 and the part information indication 232 displayed next are moved from the second position to the first position, and a character icon 228 corresponding to the terminal at which the part HP indication 220 has been tapped and a part information indication 232 corresponding to the tapped part HP indication 220 are newly displayed at the second position.

Furthermore, in this example, the configuration may be such that in the case where two sets of character icons 228 and part information indications 232 are displayed and the minimum display period of the part information indication 232 displayed earliest has not elapsed, when one of the part HP indications 220 is tapped at one of the terminals participating in a quest, a designation indication is displayed immediately under the tapped part HP indication 220, a character icon 228 corresponding to the terminal at which the part HP indication 220 has been tapped and a part information indication 232 corresponding to the tapped part HP indication 220 are not displayed, and the already displayed two sets of character icons 228 and part information indications 232 are displayed continuously.

Furthermore, in this example, the configuration may be such that a display period of each part information indication 232 is not set, and in the case where two sets of character icons 228 and part information indications 232 are displayed, when one of the part HP indications 220 is tapped at one of the terminals participating in a quest, a designation indication 234 is displayed immediately under the tapped part HP indication 220, the character icon 228 and the part information indication 232 displayed earliest among the two sets of character icons 228 and part information indications 232 are erased from the first position, the character icon 228 and the part information indication 232 displayed next are moved from the second position from the first position, and a character icon 228 corresponding to the terminal at which the part HP indication 220 has been tapped and a part information indication 232 corresponding to the tapped part HP indication 220 are newly displayed at the second position.

That is, the configuration may be such that in the case where a plurality of part indications are displayed and specific information and player information are to be further obtained, the part indication displayed earliest among the plurality of part indications is erased under a predetermined condition, and a part indication based on the further obtained specific information and player information is displayed.

Furthermore, the above-described embodiment has been described in the context of an example where even in the case where part information and player character information of the local terminal or one of the other terminals have been further obtained, a part information indication 232 and a character icon 228 based on the further obtained part information and player character information are not displayed until the elapse of five seconds since the indication-update prohibition flag being turned on; however, the configuration may be such that even in the case where part information and player character information of the local terminal or one of the other terminals have been further obtained, a part information indication 232 and a character icon 228 based on the further obtained part information and player character information are not displayed until the elapse of a predetermined time since the receipt of the part information and player character information of the other terminal.

Alternatively, the configuration may be such that even in the case where part information and player character information of the local terminal or one of the other terminals have further been obtained, a part information indication 232 and a character icon 228 based on the further obtained part information and player character information are not displayed until the elapse of a predetermined time since a part information indication 232 is displayed.

Alternatively, the configuration may be such that even in the case where part information and player character information of the local terminal or one of the other terminals have further been obtained, a part information indication 232 and a character icon 228 based on the further obtained part information and player character information are not displayed until the elapse of a predetermined time since a tap on one of the part HP indications 220 is accepted as an input for displaying a part information indication 232.

Alternatively, the configuration may be such that until the elapse of a predetermined time since one of the part HP indications 220 is tapped at one of the terminals participating in a quest, even in the case where one of the part HP indications 220 is further tapped at one of the terminals, a part information indication 232 and a character icon 228 based on the further obtained part information and player character information are not displayed.

Furthermore, in this case, the configuration may be such that when a battle against the enemy character is started in a multi-player quest, the elapsed time of the battle is measured at each of the terminals participating in the quest, and when one of the part HP indications 220 is tapped, tap time information corresponding to the elapsed time at the timing of the tapping on the part HP indication is sent to the server device 12, the tap time information of the local terminal is sent from the server device 12 to the individual other terminals participating in the quest, and even in the case where one of the part HP indications 220 is further tapped at one of the terminals, a part information indication 232 and a character icon 228 based on the further obtained part information and player character information are not displayed until the elapse of a predetermined time since the tap timing.

Furthermore, the above-described embodiment has been described in the context of an example where processing for displaying a designation indication 234 and processing for displaying a part information indication 232 and a character icon 228 are executed in the display control process shown in FIG. 11; however, the display control unit 104 may be configured to execute display control process 1 and display control process 2, and the display control unit 104 may be configured such that, in display control process 1, when part information and player number information of the local terminal or one of the other terminals have been obtained, a designation indication 234 corresponding to the obtained player number information is displayed immediately under a part HP indication 220 corresponding to the obtained part information on the basis of the obtained part information and player number information.

Furthermore, the display control unit 104 may be configured such that, in display control process 2, when part information and player character information of the local terminal or one of the other terminals has been obtained, whether or not the indication-update prohibition flag is turned off is determined, and in the case where the indication-update prohibition flag is turned off, a tap on one of the first-part HP indication 220-1 to the third-part HP indication 220-3 is accepted as an input for displaying a part information indication 232, and a part information indication 232 corresponding to the obtained part information and a character icon 228 corresponding to the obtained player character information are displayed on the basis of the obtained part information and player character information, whereas in the case where the indication-update prohibition flag is not turned off, a tap on one of the first-part HP indication 220-1 to the third-part HP indication 220-3 is not accepted as an input for displaying a part information indication 232, and the already displayed character icon 228 and part information indication 232 are displayed continuously.

Furthermore, the above-described embodiment has been described in the context of an example where when one of the part HP indications 220 is tapped at one of the terminals participating in a quest, even in the case where the hit points corresponding to the tapped part HP indication 220 is zero, a designation indication 234 is displayed immediately under the tapped part HP indication 220, and a character icon 228 corresponding to the terminal at which the part HP indication 220 has been tapped and a part information indication 232 corresponding to the tapped part HP indication 220 are displayed; however, the configuration may be such that in the case where the hit points corresponding to the tapped part HP indication 220 is zero, at the terminal at which the part HP indication 220 has been tapped, part information, player character information, and player number information are not sent to the server device 12, and at each of the terminals participating in the quest, a designation indication 234 is not displayed immediately under the tapped part HP indication 220, and a character icon 228 corresponding to the terminal at which the part HP indication 220 has been tapped and a part information indication 232 corresponding to the tapped part HP indication 220 are not displayed.

Furthermore, the above-described embodiment has been described in the context of an example where each of the first non-player character to the third non-player character is controlled to automatically perform attacking actions on the enemy character, while moving so as to basically follow the player character; however, the configuration may be such that when one of the part HP indications 220 is tapped at the local terminal, each of the first non-player character to the third non-player character is controlled to perform an attacking action targeting a part of the enemy character corresponding to the part HP indication 220 tapped at the local terminal. Specifically, the configuration may be such that a part of the enemy character object corresponding to the tapped part HP indication 220 is set as a part to be attacked and each of the first non-player character to the third non-player character is controlled to move so as to follow the part to be attacked and to perform an attacking action on the part to be attacked.

Furthermore, the above-described embodiment has been described in the context of an example where the body of the enemy character object is set as the entire range of the enemy character object; however, the configuration may be such that the body of the enemy character object is set as a part of the range of the enemy character object. Furthermore, in this example, the configuration may be such that when it is determined that an attack by the party of the local terminal or the party of one of the other terminals has hit the body of the enemy character object, the hit points of the body are updated so as to be decreased, and when it is determined that an attack has hit one of the parts of the enemy character object, the hit points of the part hit by the attack are updated so as to be decreased.

For example, the configuration may be such that when it is determined that an attack by the party of the local terminal or the party of one of the other terminals has hit one of the first part, the second part, and the third part of the enemy character, the enemy HP indication 218 is not updated, and one of the first-part HP indication 220-1, the second-part HP indication 220-2, and the third-part HP indication 220-3 is updated so as to decrease the hit points of the part hit by the attack by the party of the local terminal or the party of one of the other terminals.

Furthermore, the above-described embodiment has been described in the context of an example where the present invention is applied to an action RPG based on a third-person viewpoint; however, the present invention is applicable to various kinds of games, such as a shooting game based on a first-person viewpoint (FPS).

What is claimed is:

1. A non-transitory computer-readable information storage medium storing a program, the program causing a computer to comprise:
   a display control unit that causes a display device to display a graphical user interface (GUI) comprising a first GUI character object, a second GUI character object, and a plurality of specific indications corresponding to a plurality of character parts of the second GUI character object;
   a processing unit that:
      causes the first GUI character object to perform an action based on an input by a player to the graphical user interface,
      updates a parameter corresponding to a character part satisfying a given condition as a result of the action of the first GUI character object among the plurality of character parts of the second GUI character object, and
      selects the second GUI character object from among a plurality of GUI character objects, wherein the plurality of GUI character objects are different kinds of non-player characters that comprise rendered images and are automatically controlled to perform one or more attacking actions in a common object space on the first GUI character object; and
   a communication control unit that sends first specific information corresponding to a specific player input and first player information corresponding to the player to an external network based on the specific player input, the specific player input being an input by the player to the graphical user interface that selects one of the plurality of specific indications communicating at least one action being performed based on at least one character part among the plurality of character parts of the second GUI character object in the common object space,
   wherein the communication control unit receives second specific information and second player information of another terminal from the external network, and wherein, in response to the second specific information and the second player information being received, the display control unit, based on the second specific information and the second player information, causes the display device to display a part indication indicating a character part corresponding to the second specific information among the plurality of character parts in association with a player indication corresponding to the second player information.

2. The non-transitory computer-readable information storage medium according to claim 1,
wherein, in response to third specific information and third player information are further received under a predetermined condition, the display control unit does not cause the display device to display the part indication based on the third specific information and the third player information.

3. The non-transitory computer-readable information storage medium according to claim 2,
wherein, in response to a predetermined number of part indications are displayed the third specific information and the third player information are further received, the display control unit does not cause the display device to display the part indication based on the third specific information and the third player information.

4. The non-transitory computer-readable information storage medium according to claim 2,
wherein, in response to the third specific information and the third player information are further received, the display control unit does not cause the display device to display the part indication based on the third specific information and the third player information until an elapse of a predetermined time since a receipt of the third specific information and the third player information.

5. The non-transitory computer-readable information storage medium according to claim 2,
wherein, the third specific information and the third player information are further received, the display control unit does not cause the display device to display the part indication based on the third specific information and the third player information until an elapse of a predetermined time since the part indication is displayed.

6. The non-transitory computer-readable information storage medium according to claim 1,
wherein the display control unit, based on the specific player input, causes the display device to display a part indication indicating a part corresponding to the specific player input among the plurality of character parts in association with a player indication corresponding to third player information of a local terminal.

7. The non-transitory computer-readable information storage medium according to claim 6,
wherein, in response to third specific information and third player information are further received, the display control unit does not cause the display device to display the part indication based on the third specific information and the third player information until an elapse of a predetermined time since the specific player input is accepted.

8. The non-transitory computer-readable information storage medium according to claim 1,
wherein, in response to a predetermined number of part indications are displayed and third specific information and third player information are further received, the display control unit erases a part indication displayed earliest among the predetermined number of part indications under a predetermined condition and causes the display device to display the part indication based on the third specific information and the third player information.

9. A game device, the game device comprising:
a display control unit that causes a display device to display a graphical user interface (GUI) comprising a first GUI character object, a second GUI character object, and a plurality of specific indications corresponding to a plurality of character parts of the second GUI character object;
a processing unit that:
    causes the first GUI character object to perform an action based on an input by a player to the graphical user interface,
    updates a parameter corresponding to a character part satisfying a given condition as a result of the action of the first GUI character object among the plurality of character parts of the second GUI character object, and
    selects the second GUI character object from among a plurality of GUI character objects, wherein the plurality of GUI character objects are different kinds of non-player characters that comprise rendered images and are automatically controlled to perform one or more attacking actions in a common object space on the first GUI character object; and
a communication control unit that sends first specific information corresponding to a specific player input and first player information corresponding to the player to an external network of based on the specific player input, the specific player input being an input by the player to the graphical user interface that selects one of the plurality of specific indications communicating at least one action being performed based on at least one character part among the plurality of character parts of the second GUI character object in the common object space,
wherein the communication control unit receives second specific information and second player information of another terminal from the external network, and
wherein, in response to the second specific information and the second player information being received, the display control unit, based on the second specific information and the second player information, causes the display device to display a part indication indicating a character part corresponding to the second specific information among the plurality of character parts in association with a player indication corresponding to the second player information.

10. A game system comprising:
a plurality of terminals, wherein each of the plurality of terminals comprises:
a display control unit that causes a display device to display a graphical user interface (GUI) comprising a first GUI character object, a second GUI character object, and a plurality of specific indications corresponding to a plurality of character parts of the second GUI character object;
a processing unit that:
    causes the first GUI character object to perform an action based on an input by a player to the graphical user interface,
    updates a parameter corresponding to a character part satisfying a given condition as a result of the action of the first GUI character object among the plurality of character parts of the second GUI character object, and selects the second GUI character object from among a plurality of GUI character objects, wherein the plurality of GUI character objects are different kinds of non-player characters that comprise rendered images and are automatically controlled to perform one or more attacking actions in a common object space on the first GUI character object; and a communication control unit that sends first specific information corresponding to a specific player input and first player information corresponding to the player to an external network based on the specific player input, the specific player input being an input by the player to the graphical user interface selects one of the plurality of specific indications communicating at least one action being performed based on at least one character part among the plurality of character parts of the second GUI character object in the common object space, wherein the communication control unit receives second specific information and second player information of another terminal from the external network, and wherein, in response to the second specific information and the second player information being received, the display control unit, based on the second specific information and the second player information, causes the display device to display a part indication indicating a character part corresponding to the second specific information among the plurality of character parts in association with a player indication corresponding to the second player information.

* * * * *